US011920305B1

(12) United States Patent
Wang et al.

(10) Patent No.: US 11,920,305 B1
(45) Date of Patent: Mar. 5, 2024

(54) PREPARATION METHOD AND APPLICATION OF MULTIFUNCTIONAL INTELLIGENT CELLULOSE-BASED VISUAL LABEL

(71) Applicant: Northeast Forestry University, Harbin (CN)

(72) Inventors: Lijuan Wang, Harbin (CN); Ruoting Liu, Harbin (CN)

(73) Assignee: Northeast Forestry University, Harbin (CN)

( * ) Notice: Subject to any disclaimer, the term of this patent is extended or adjusted under 35 U.S.C. 154(b) by 0 days.

(21) Appl. No.: 18/473,215

(22) Filed: Sep. 23, 2023

(30) Foreign Application Priority Data

Jan. 30, 2023 (CN) ......................... 202310046093.0

(51) Int. Cl.

| | |
|---|---|
| ***D21H 11/22*** | (2006.01) |
| ***D21C 9/00*** | (2006.01) |
| ***D21H 11/12*** | (2006.01) |
| ***D21H 21/28*** | (2006.01) |
| ***G09F 3/00*** | (2006.01) |
| *G09F 3/02* | (2006.01) |

(52) U.S. Cl.

CPC ............. *D21H 11/22* (2013.01); *D21C 9/005* (2013.01); *D21H 11/12* (2013.01); *D21H 21/28* (2013.01); *G09F 3/0291* (2013.01); *G09F 2003/0283* (2013.01)

(58) Field of Classification Search

CPC ........ D21H 11/22; D21H 11/12; D21H 21/28; D21C 9/005; G09F 3/0291; G09F 2003/0283

USPC ....................................................... 162/157.6

See application file for complete search history.

(56) References Cited

U.S. PATENT DOCUMENTS

2018/0333975 A1* 11/2018 Bollström ............ D21H 17/675

OTHER PUBLICATIONS

Northeast Forestry University (Applicant), Allowed claims for CN202310046093.0, Jan. 30, 2023.

CNIPA, Notification to grant patent right for invention in CN202310046093.0, Jul. 16, 2023.

* cited by examiner

*Primary Examiner* — Mark Halpern

(74) *Attorney, Agent, or Firm* — Zhigang Ma

(57) ABSTRACT

A preparation method and an application method of a multifunctional intelligent cellulose-based visual label are provided. The multifunctional intelligent cellulose-based visual label solved a problem that an existing freshness indicator film is narrowed in an indication range. The preparation method includes the following steps: step 1 of carboxylation modification; step 2 of cationic grafting; step 3 of preparation of a composite dye solution; step 4 of preparation of responsive fibers; and step 5 of performing vacuum filtration to prepare paper, thereby obtaining the multifunctional intelligent cellulose-based visual label. The food freshness is indicated with the obtained intelligent visual label. An indicated pH value range is 4-8, color variation can be completed within 30 seconds, and the food freshness can be accurately indicated. The multifunctional intelligent cellulose-based visual label is low-carbon, efficient, green, safe, and wide in the indication range, and can be used in food monitoring.

6 Claims, 27 Drawing Sheets

PREPARATION METHOD AND APPLICATION OF MULTIFUNCTIONAL INTELLIGENT CELLULOSE-BASED VISUAL LABEL

TECHNICAL FIELD

The disclosure relates to a preparation method and application method of an intelligent label.

BACKGROUND

Food safety has always been a close concern for public. Meat, aquatic products, fruits, and vegetables that have not been subjected to deep processing and cooking are collectively referred to as fresh food. The fresh food is short in shelf life and easy to decay and deteriorate at room temperature. Among the fresh food, pork is caught more attention from the public in the meat products, and the vegetables are necessities, which has become the second largest agricultural product. Milk contains most of essential nutrients for maintaining normal life and is easily digested and absorbed by human body, and therefore, the milk is an indispensable food. However, fresh milk contains a large number of microorganisms, which can cause oxidation and decomposition of lipid and protein, and thus result in rot of the milk. As commonly recorded, disease enters by the mouth, and if the safety of the food ate by the public cannot be guaranteed, it will inevitably become a major threat to human health. Therefore, it is important to ensure the safety quality of the fresh food, and it is of an urgent need to develop a convenient detection mode. An existing freshness indicator film is narrowed in an indication range and cannot realize the detection of various kinds of food at the same time. In addition, a hydrogel indicator film may also have problems, such as easy moisture absorption and swelling and a high transparency, in a practical application.

SUMMARY

The disclosure aims to solve a technical problem that an existing freshness indicator film is narrowed in an indication range, thereby providing a preparation method and application method of a multifunctional intelligent cellulose-based visual label (also referred to an intelligent cellulose-based visual label).

The method for preparing the multifunctional intelligent cellulose-based visual label of the disclosure includes the following steps:

step 1, carboxylation modification, including: adding straw fibers into an oxalic acid aqueous solution with a mass percentage concentration of 25%-50%, heating the straw fibers and the oxalic acid aqueous solution to a temperature of 78 degrees Celsius (° C.) to 82° C. along with magnetic stirring for 0.5 hours (h) to 1 h to perform a reaction between the straw fibers and the oxalic acid aqueous solution; after the reaction is finished, obtaining a reaction product, adding ethanol absolute into the reaction product to remove residual oxalic acid of the reaction product and thereby to obtain a first product, and performing rotary evaporation on the first product to recycle ethanol in the first product and obtain a second product; filtering the second product to obtain filtrate, flushing precipitate in the filtrate with the ethanol until a conductivity of the filtrate is stable, and thereby obtaining carboxylated fibers (also referred as to carboxylated straw fibers);

step 2, cationic grafting, including: adding the carboxylated fibers into a chitosan quaternary ammonium salt aqueous solution with a concentration of 20 grams per liter (g/L) to 30 g/L, performing magnetic stirring on the carboxylated fibers and the chitosan quaternary ammonium salt aqueous solution for 0.5 h to 4 h at room temperature, and then filtering and washing with water to obtain quaternized fibers (also referred as to quaternized straw fibers);

step 3, preparation of a composite dye solution, including: dissolving bromothymol blue and methyl red at a mass ratio of 1:(0.9-1) in a sodium hydroxide solution with a concentration of 0.045 moles per liter (mol/L) to 0.055 mol/L to obtain the composite dye solution;

step 4, preparation of responsive fibers, including: adding the quaternized fibers into the composite dye solution, placing the composite dye solution added with the quaternized fibers in an oscillating water bath machine to perform an oscillatory adsorption for 3.5 h to 4 h, and then eluting dyes physically attached to surfaces of the quaternized fibers with sodium hydroxide solution with a concentration of 0.045 mol/L to 0.055 mol/L, and washing the quaternized fibers with distilled water until a potential of hydrogen (pH) of the filtrate is neutral, thereby obtaining the responsive fibers;

step 5, preparation of the multifunctional intelligent cellulose-based visual label, including: performing vacuum filtration on the responsive fibers to obtain paper with a basis weight of 65 grams per square meter ($g/m^2$) to 70 $g/m^2$, and then drying the paper to obtain the intelligent cellulose-based visual label.

In an embodiment, in the step 1, a mass ratio of the straw fibers to the oxalic acid aqueous solution with the mass percentage concentration of 25%-50% is 1:(49-51).

In an embodiment, in the step 1, when a difference between a conductivity of the filtrate before performing the filtering and a conductivity of the filtrate after performing the filtering for 10 minutes (min) to 15 min is less than 50 millisens per centimeter (mS/cm), the conductivity of the filtrate is stable.

In an embodiment, in the step 2, a solid-liquid mass ratio of the carboxylated fibers to the chitosan quaternary ammonium salt aqueous solution with the concentration of 20 g/L to 30 g/L is 1:(49-51).

In an embodiment, in the step 3, the concentration of the sodium hydroxide solution is in a range of 0.045 mol/L to 0.055 mol/L.

In an embodiment, in the step 3, a concentration of the bromothymol blue in the composite dye solution is in a range of 49.9 milligrams per liter (mg/L) to 50.1 mg/L, and a concentration of the methyl red in the composite dye solution is in a range of 49.9 mg/L to 50.1 mg/L.

In an embodiment, in the step 4, a rotating speed of the oscillating water bath machine is in a range of 145 revolutions per minute (r/min) to 150 r/min.

An application method of the multifunctional intelligent cellulose-based visual label prepared by the foregoing method is to use the multifunctional intelligent cellulose-based visual label to indicate freshness of food; and the food is at least one selected from the group consisting of milk, pork, and spinach.

According to the multifunctional intelligent cellulose-based visual label of the disclosure, the oxalic acid is used to carboxylate the straw fibers, thereby introducing negative charges; and then the introduced negative charges are grafted with positive charges of the chitosan quaternary ammonium salt through an electrostatic interaction, and free positive charges at the other end of the straw fibers are used for adsorbing the composite indicator, i.e., the bromothymol blue and the methyl red. Finally, the intelligent cellulose-based indicator label is self-assembled through simple and efficient vacuum filtration.

The indicator label can indicate that the pH value in a range of 4 to 8, the color varies rapidly, and the color variation can be completed within 30 seconds (s), which successfully indicates the freshness of various foods, such as milk, pork, and spinach. In addition, the multifunctional intelligent cellulose-based visual label has good dimensional stability, and there is no need to worry about the problems of wet deformation and fracture in the practical application. Moreover, the multifunctional intelligent cellulose-based visual label has a 100% antibacterial rate against *Staphylococcus aureus*, thereby achieving use safety and sanitation, avoiding bacterial contamination, and prolonging the service life of the label. Furthermore, the dyes anchored through the ion bonds are not prone to falling off, thereby avoiding the problem of dye migration, and the opaque cellulose matrix enables the color variation to be more easily observed. The disclosure provides the method for preparing the multifunctional intelligent cellulose-based visual label in a low-carbon, effective, green, and safe manner; and makes the multifunctional intelligent cellulose-based visual label wide in the indication range.

DETAILED DESCRIPTION OF EMBODIMENTS

Figure 1A:
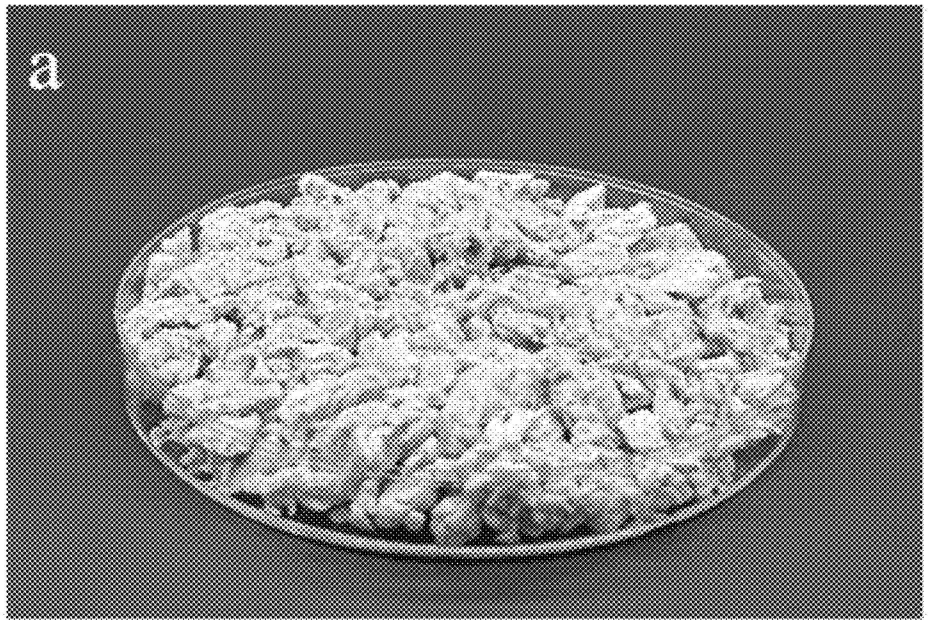
FIGS. 1A to 1I illustrate photographs and microscopic morphology diagrams of straw fibers and carboxylated fibers obtained in a step 1 and quaternized fibers obtained in a step 2 according to an embodiment 1.

Beneficial effects of the disclosure are verified with the following embodiments.

Embodiment 1 provides a method for preparing a multifunctional intelligent cellulose-based visual label, which is performed by the following steps:

- step 1 of carboxylation modification, including: adding 2 grams (g) of straw fibers (SF) into 100 g of an oxalic acid aqueous solution with a mass percentage concentration of 25%, heating the straw fibers and the oxalic acid aqueous solution to a temperature of 80 degrees Celsius (° C.) along with magnetic stirring for 1 hour (h) to perform a reaction between the straw fibers and the oxalic acid aqueous solution; after the reaction is finished, obtaining a reaction product, adding ethanol absolute into the reaction product to remove residual oxalic acid of the reaction product and thereby to obtain a first product, and performing rotary evaporation on the first product to recycle ethanol in the first product and obtain a second product; filtering the second product to obtain filtrate, flushing precipitate in the filtrate with the ethanol until a conductivity of the filtrate is stable, and thereby obtaining carboxylated straw fibers (OA-SF, also referred as to carboxylated fibers);
- step 2 of cationic grafting, including: adding 2 g of the carboxylated straw fibers into 100 milliliters (mL) of a chitosan quaternary ammonium salt aqueous solution with a concentration of 20 grams per liter (g/L), performing magnetic stirring on the carboxylated straw fibers and the chitosan quaternary ammonium salt aqueous solution for 4 h at room temperature, and then filtering and washing with water to obtain quaternized fibers (CQ-OASF, also referred as to quaternized straw fibers);
- step 3 of preparation of a composite dye solution, including: dissolving 0.05 g of bromothymol blue and 0.05 g of methyl red in 1,000 mL of a sodium hydroxide solution with a concentration of 0.05 moles per liter (mol/L) to obtain the composite dye solution;

step 4 of preparation of responsive fibers, including: adding the quaternized fibers into the composite dye solution, placing the composite dye solution added with the quaternized fibers in an oscillating water bath machine to perform an oscillatory adsorption at 150 revolutions per minute (r/min) for 4 h, and then eluting dyes physically attached to surfaces of the quaternized fibers with sodium hydroxide solution with a concentration of 0.05 mol/L, and washing the quaternized fibers with distilled water until a potential of hydrogen (pH) of the filtrate is neutral, thereby obtaining the responsive fibers;

step 5 of preparation of the multifunctional intelligent cellulose-based visual label, including: performing vacuum filtration on the responsive fibers to obtain paper with a basis weight of 70 grams per square meter ($g/m^2$), and then drying the paper to obtain the multifunctional intelligent cellulose-based visual label. Meanwhile, the straw fibers and the carboxylated straw fibers obtained in the step 1 of the embodiment 1 and the quaternized fibers obtained in the step 2 of the embodiment 1 are respectively performed vacuum filtration to obtain various types of paper with a basis weight of 70 $g/m^2$, and then the various types of paper are respectively dried to obtain cellulose paper (also referred to straw fiber paper), carboxylated fiber paper, and quaternized fiber paper, which are used in comparative embodiments.

Figure 1B:
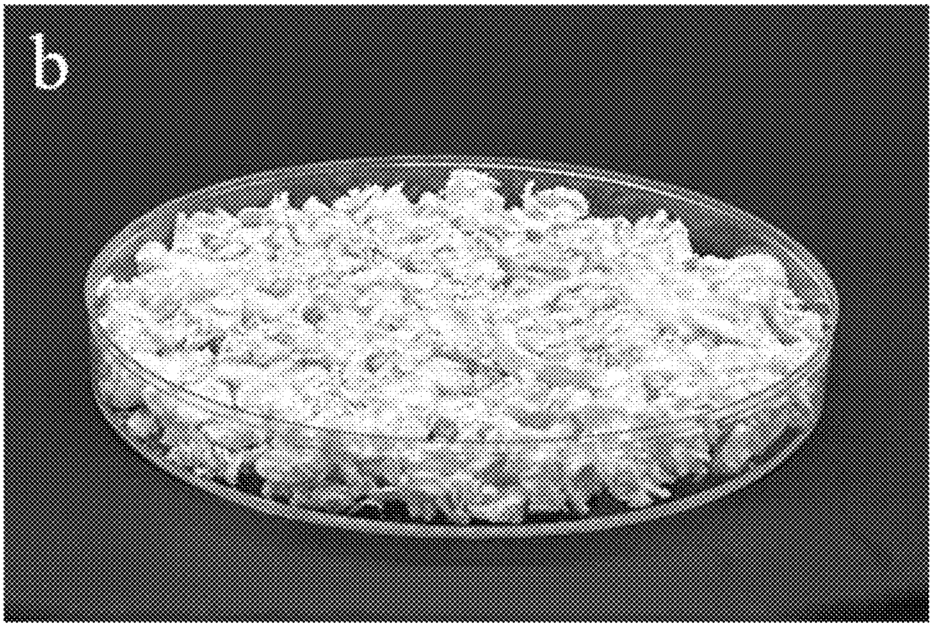
Figure 1C:
Figure 1D:
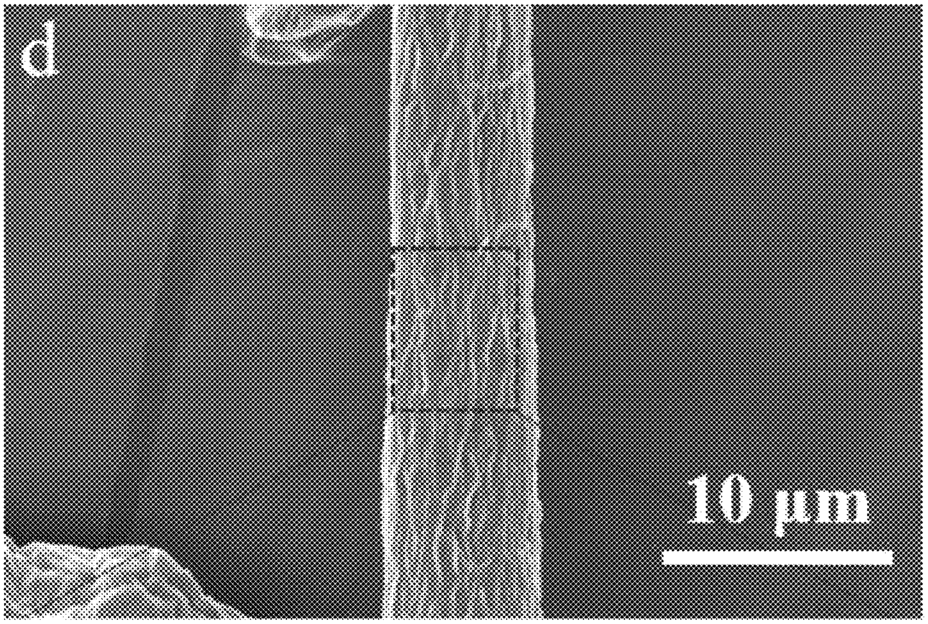
Figure 1E:
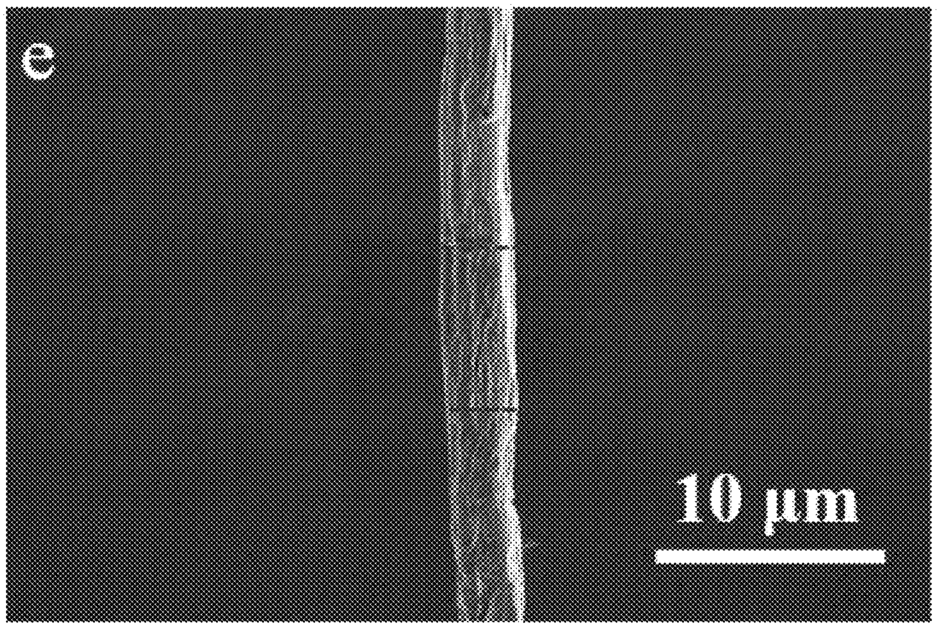
Figure 1F:
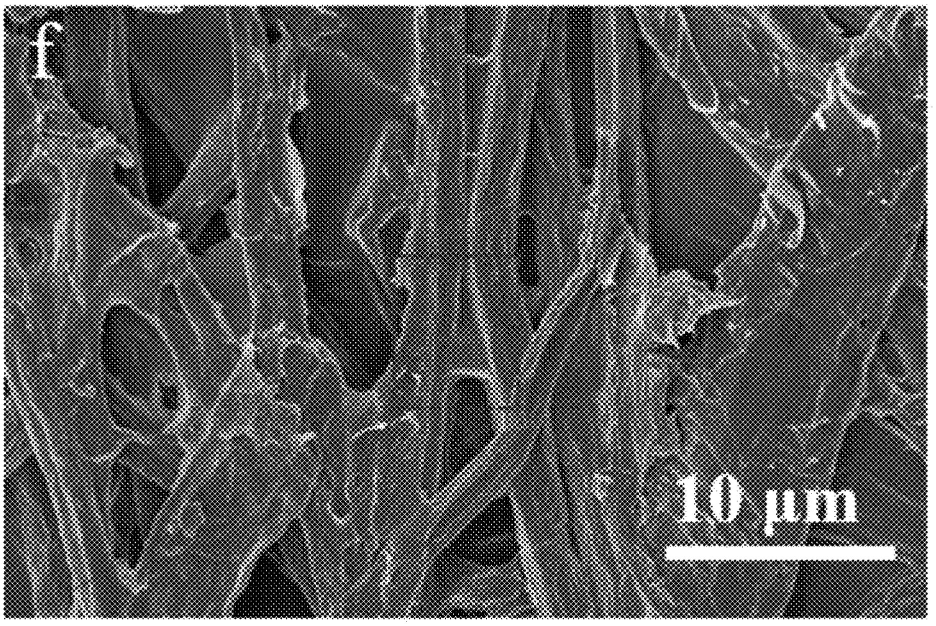
Figure 1G:
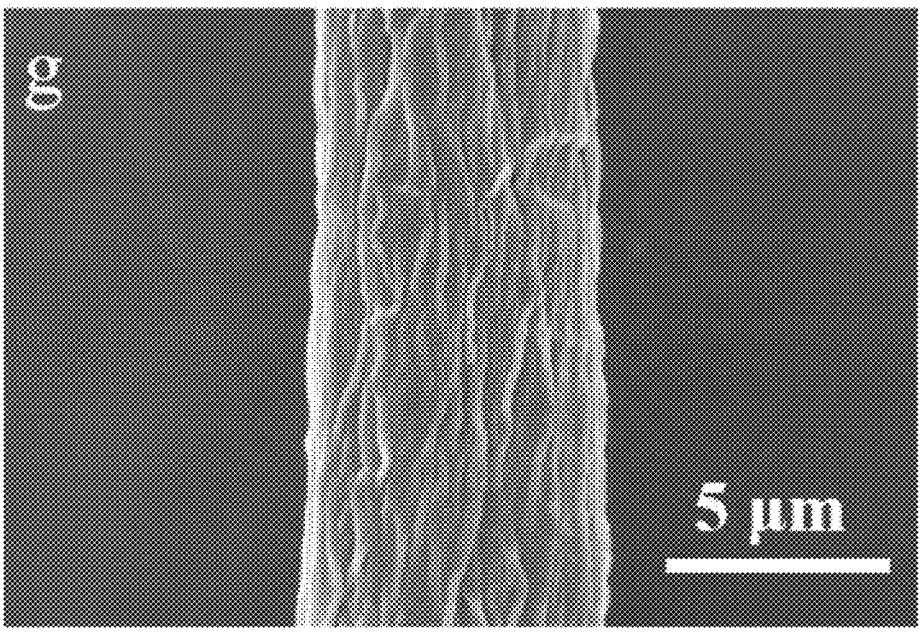
Figure 1H:
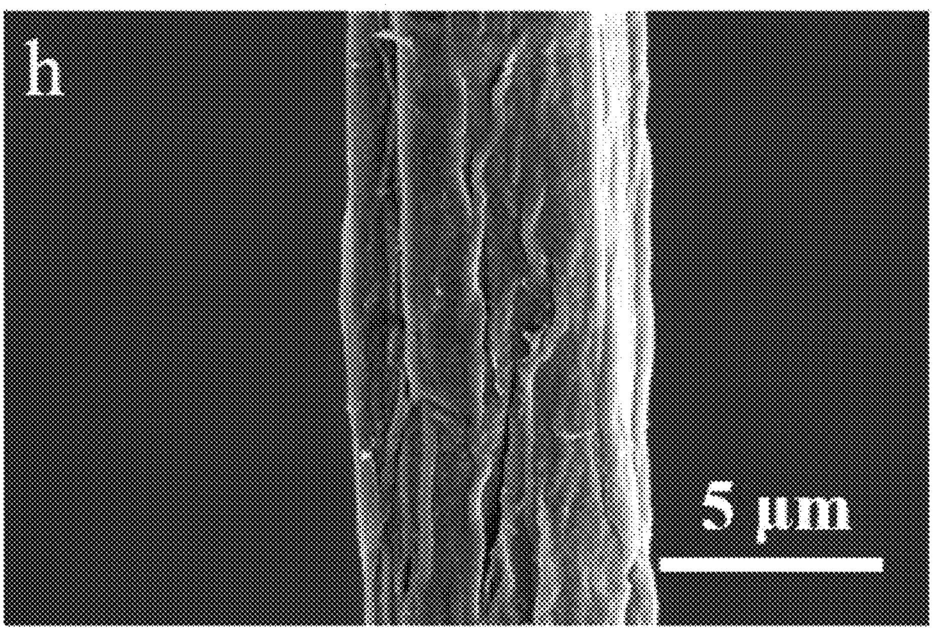
Figure 1I:
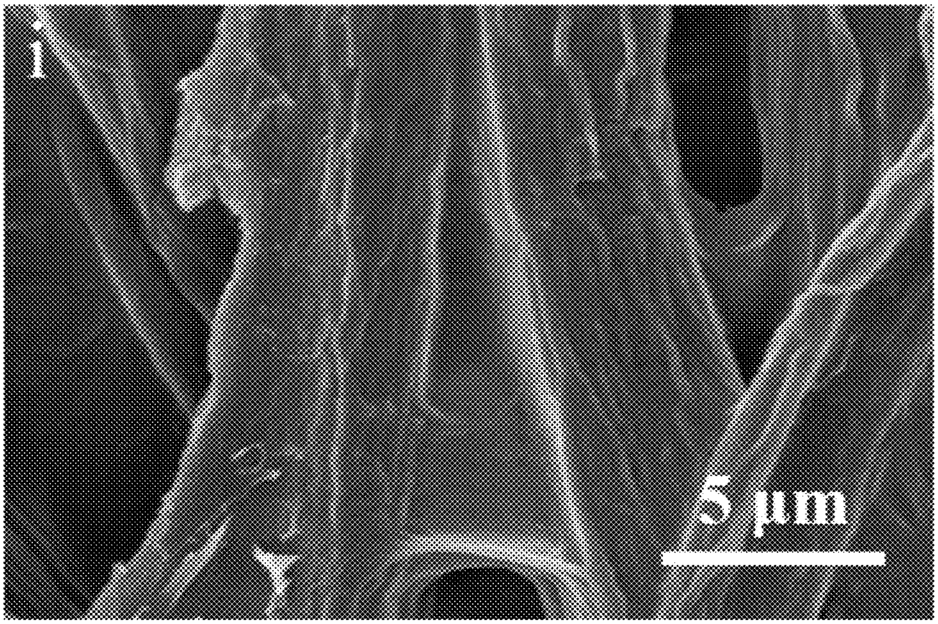

In the embodiment 1, photographs and microscopic morphology diagrams of the straw fibers and the carboxylated fibers obtained in the step 1, and a photograph and microscopic morphology diagrams of the quaternized fibers obtained in the step 2 are illustrated in FIGS. 1A-1I. Among them, FIG. 1A, FIG. 1D, and FIG. 1G illustrate the photograph and the microscopic morphology diagrams in different scales (i.e., FIG. 1D illustrates a scale in 10 micrometers abbreviated as m and FIG. 1G illustrates a scale in 5 m) of the straw fibers, respectively. It can be seen from FIG. 1D and FIG. 1G that the straw fibers were present in a form of a single thin-walled cell with a pleated surface structure, which is due to the removal of lignin and collapse of the cell wall during fiber separation. Furthermore, FIG. 1B, FIG. 1E, and FIG. 1H illustrate the photograph and the microscopic morphology diagrams in different scales of the carboxylated fibers, respectively. It can be seen from FIG. 1E and FIG. 1H that the carboxylated fibers obtained after acid treatment (i.e., the oxalic acid) had insignificant change in the surface morphology of the fibers. In addition, FIG. 1C, FIG. 1F, and FIG. 1I illustrate the photograph and the microscopic morphology diagrams in different scales of the quaternized fibers, respectively. It can be seen from FIG. 1F and FIG. 1I that the quaternized fibers obtained by introducing the chitosan quaternary ammonium salts were gathered into a sheet-shaped structure from original single form and were connected together through glue. Moreover, results of energy dispersive spectrometer (EDS) indicated that the glue is the introduced chitosan quaternary ammonium salts.

Figure 2A:
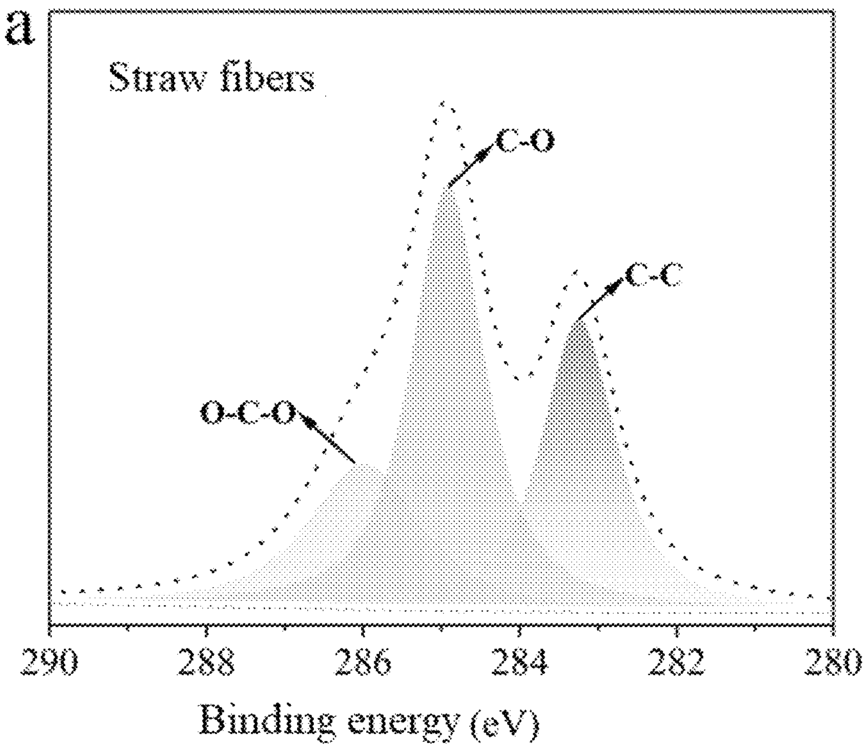
FIGS. 2A to 2F illustrate X-ray photoelectron spectroscopy (XPS) diagrams of the straw fibers and the carboxylated fibers obtained in the step 1 and the quaternized fibers obtained in the step 2 according to the embodiment 1.
Figure 2B:
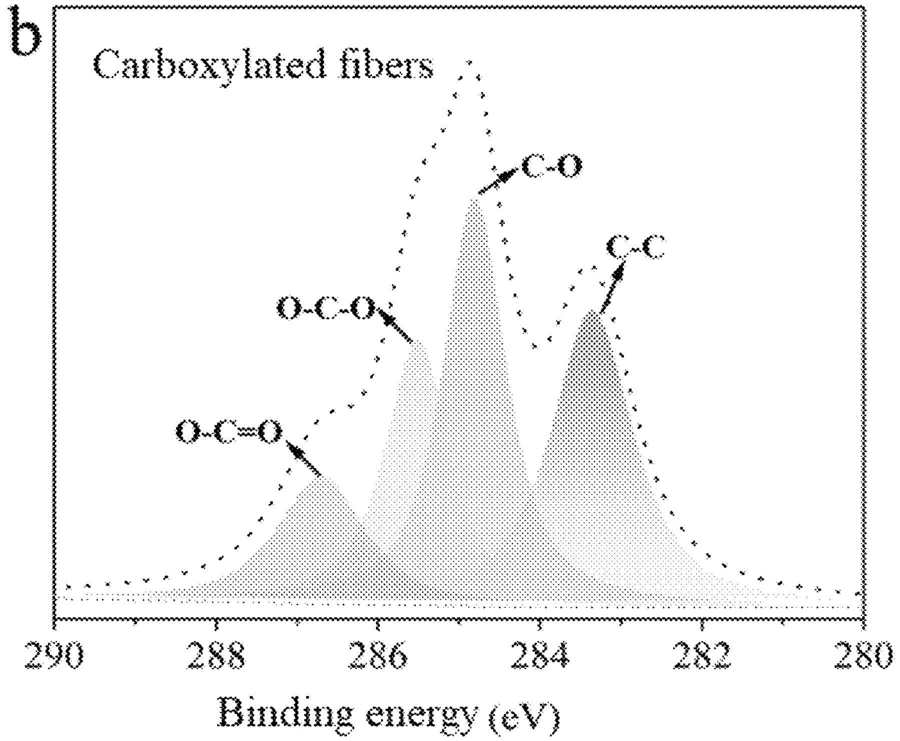
Figure 2C:
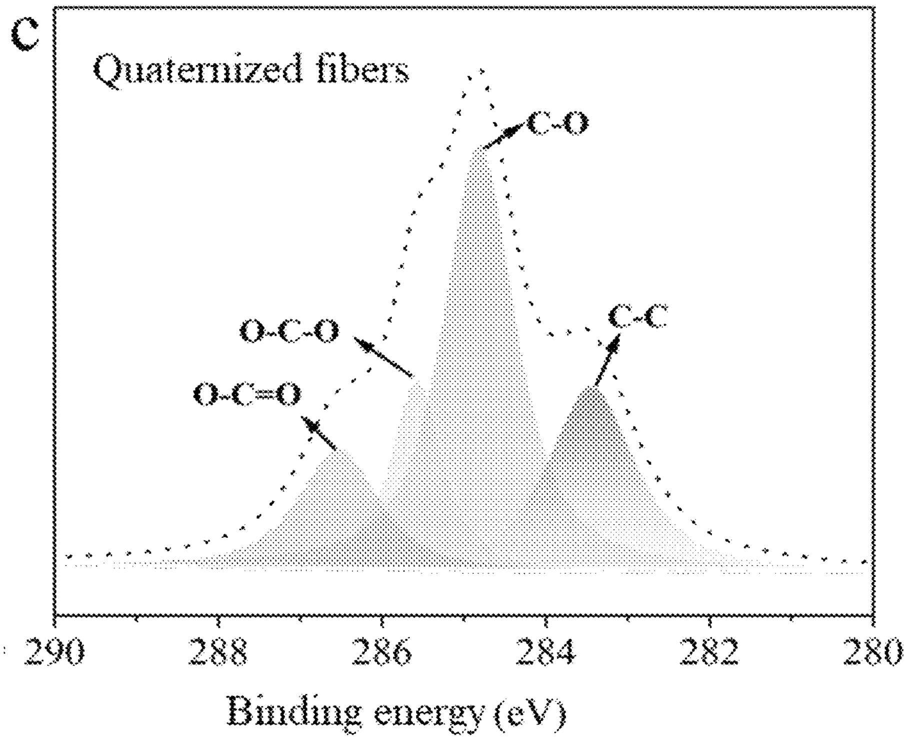
Figure 2D:
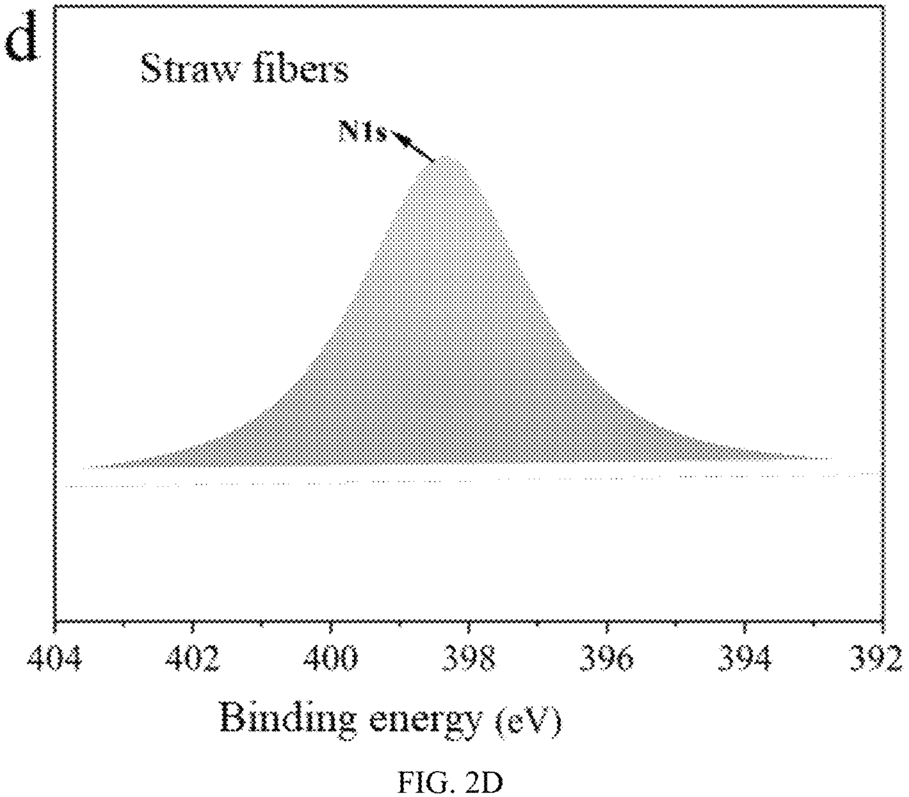
Figure 2E:
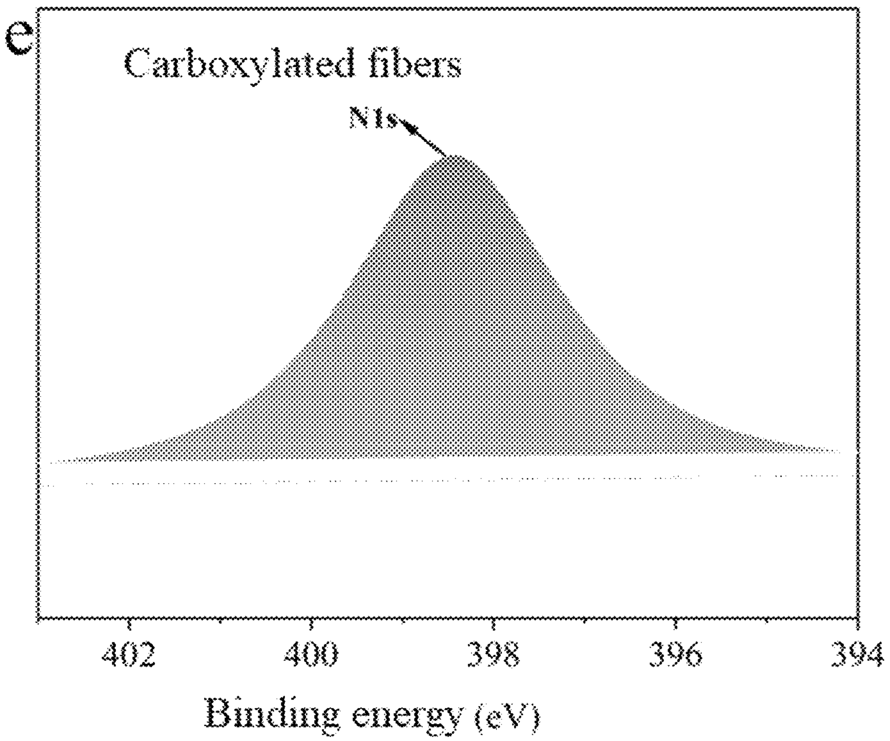
Figure 2F:
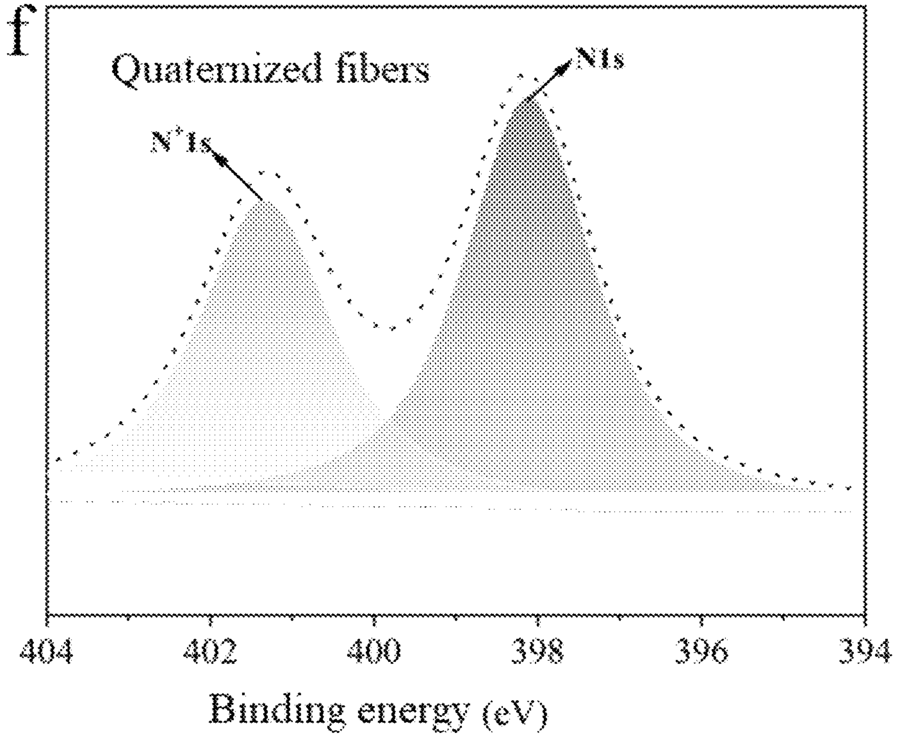

FIGS. 2A to 2F illustrate X-ray photoelectron spectroscopy (XPS) diagrams of the straw fibers, the carboxylated fibers, and the quaternized fibers according to the embodiment 1. An XPS spectrum of carbon atoms (C) in the straw fibers was fit into three peaks, which were divided into an ester group (O—C—O) at 285.98 electronvolt (eV), an acyl (C—O) at 284.91 eV, and a carbon-carbon sing bond (C—C) at 283.25 eV. And then, the straw fibers were treated by the acid solution; as shown in FIG. 2B, the XPS spectrum of the C had a new peak (at 286.7 eV), resulting from an introduced carboxyl (—COOH). After cation modification, nitrogen atoms (N) in the straw fibers were fit into two peaks, respectively, at 398.14 eV from the N peak of crude protein of the straw fibers and at 401.36 eV from the $N^+$ peak of the chitosan quaternary ammonium salts, which are shown in FIG. 2F.

Figure 3A:
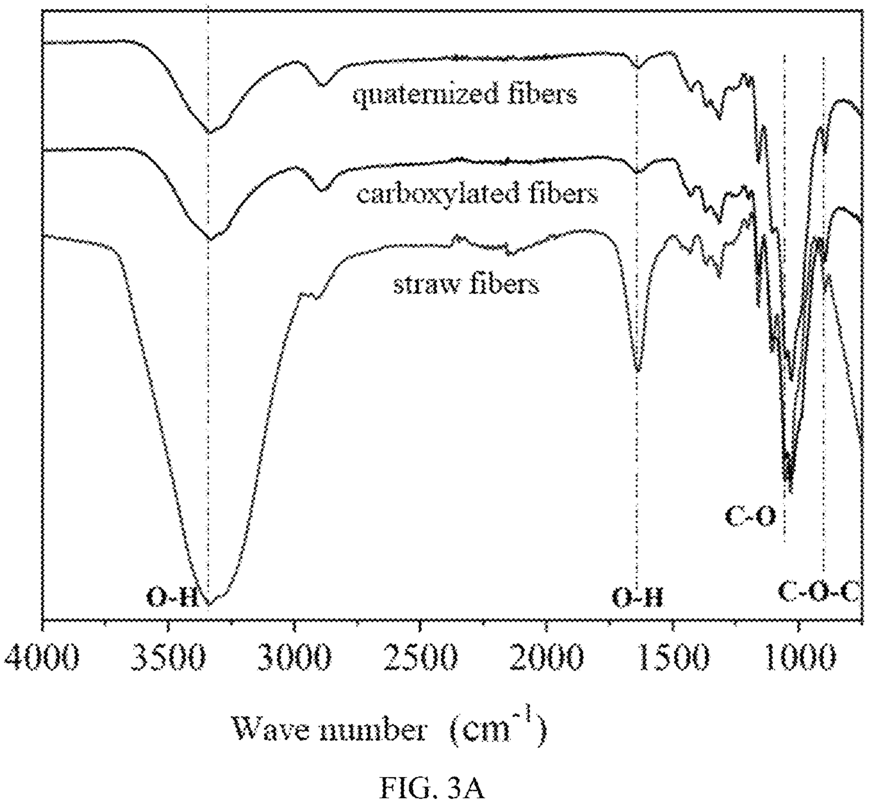
FIGS. 3A to 3C illustrate infrared spectrum diagrams of the straw fibers and the carboxylated fibers obtained in the step 1 and the quaternized fibers obtained in the step 2 according to the embodiment 1.
Figure 3B:
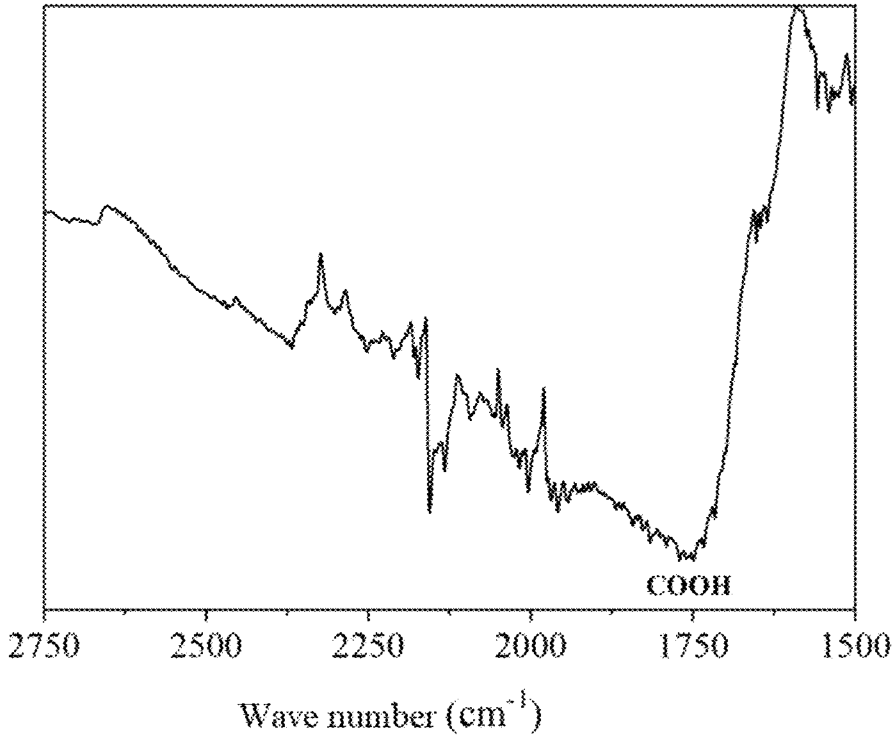
Figure 3C:
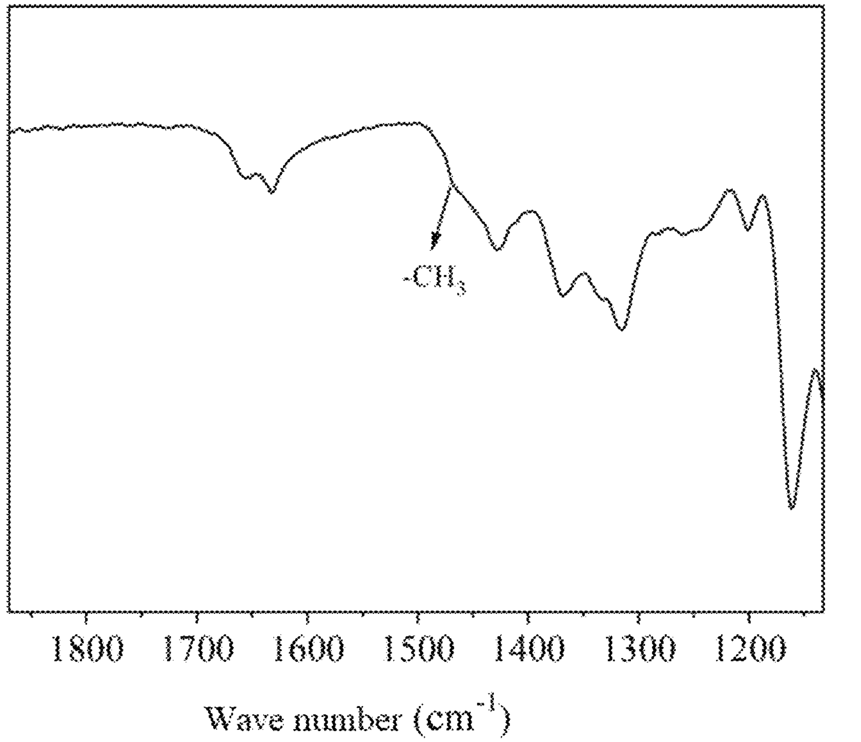

FIGS. 3A to 3C illustrate infrared spectrum diagrams of the straw fibers, the carboxylated fibers, and the quaternized fibers according to the embodiment 1. In the infrared spectrum diagram of the straw fibers, peaks at 3200-3650 $cm^{-1}$ and 1639 $cm^{-1}$ came from tension vibration and bending vibration of hydroxyl (—OH); peaks at 1056 $cm^{-1}$ and 897 $cm^{-1}$ respectively came from the C—O and an ether group (C—O—C), which were characteristic peaks of cellulose and hemicellulose, respectively. In the infrared spectrum diagram of the carboxylated fibers, a newly appeared peak at 1730 $cm^{-1}$ belonged to a tension vibration of a carbonyl group (C═O), indicating that the carboxylation modification was successful. In the infrared spectrum diagram of the quaternized fibers, a newly appeared peak at 1480 $cm^{-1}$ belonged to a methyl group (—$CH_3$) of a side chain of the chitosan quaternary ammonium salts, as shown in FIG. 3C.

Figure 4:
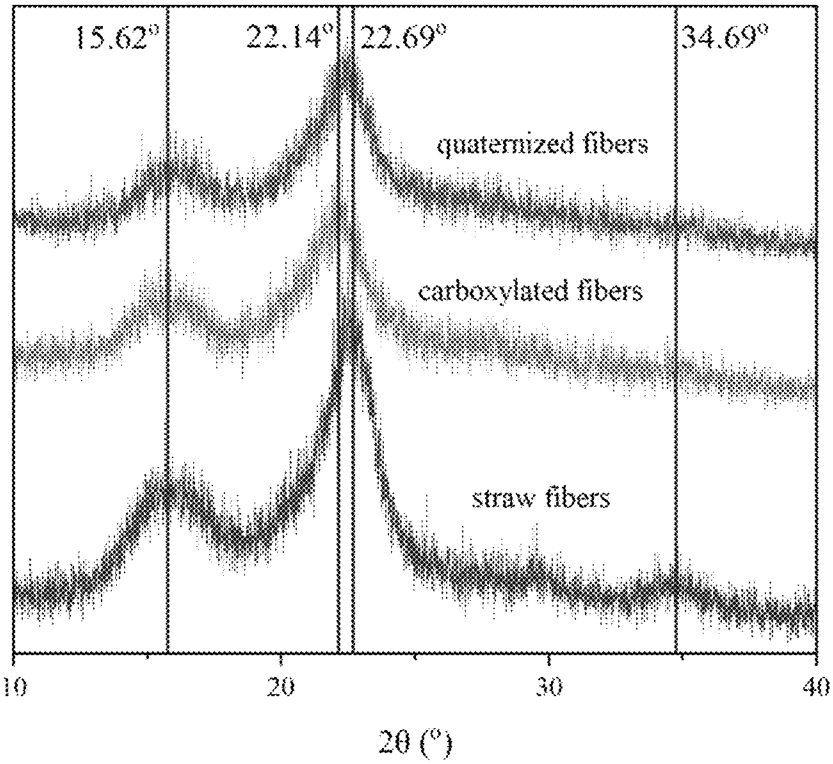
FIG. 4 illustrates an X-ray diffraction spectrum (XRD) diagram of the straw fibers and the carboxylated fibers obtained in the step 1 and the quaternized fibers obtained in the step 2 according to the embodiment 1.

FIG. 4 shows an X-ray diffraction spectrum (XRD) diagram of the straw fibers, the carboxylated fibers, and the quaternized fibers in the embodiment 1. In the XRD spectrum diagram of the straw fibers, 2θ=15.62 degrees (°), 22.69°, 34.690 belonged to a crystal plane of a typical cellulose type I (110), (200), and (040), and a crystallinity of the straw fibers was 57.5%. In the XRD spectrum diagram of the carboxylated fibers, the peak position of the cellulose type I occurred a significant left shift. The XRD spectrum diagram of the quaternized fibers was similar to that of the carboxylated fibers, indicating that the crystallization structure of the carboxylated fibers was almost not affected by the cationization modification, that most of molecular chains within the carboxylated fibers were arranged in an ordered and compact structure, not affected by the introduced chitosan quaternary ammonium salts, and that the intermolecular force among the carboxylated fibers was still strong.

Figure 5A:
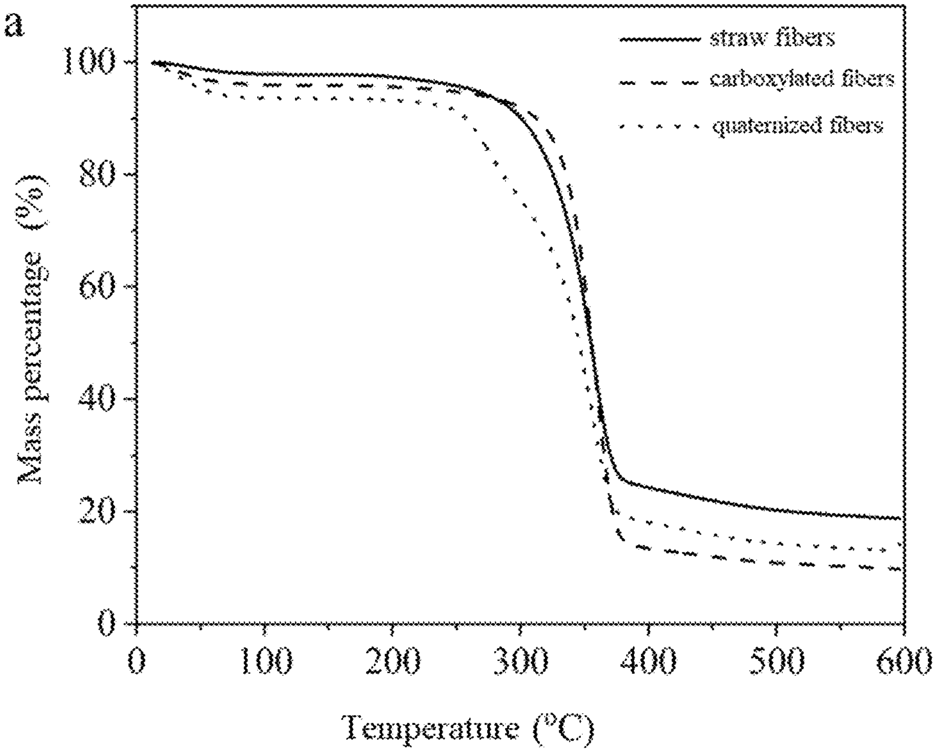
FIGS. 5A to 5C illustrate graphs of thermogravimetric analysis (TGA) curves and first derivative curves (DTG) of the TGA curves of the straw fibers and the carboxylated fibers obtained in the step 1 and the quaternized fibers obtained in the step 2 according to the embodiment 1.
Figure 5B:
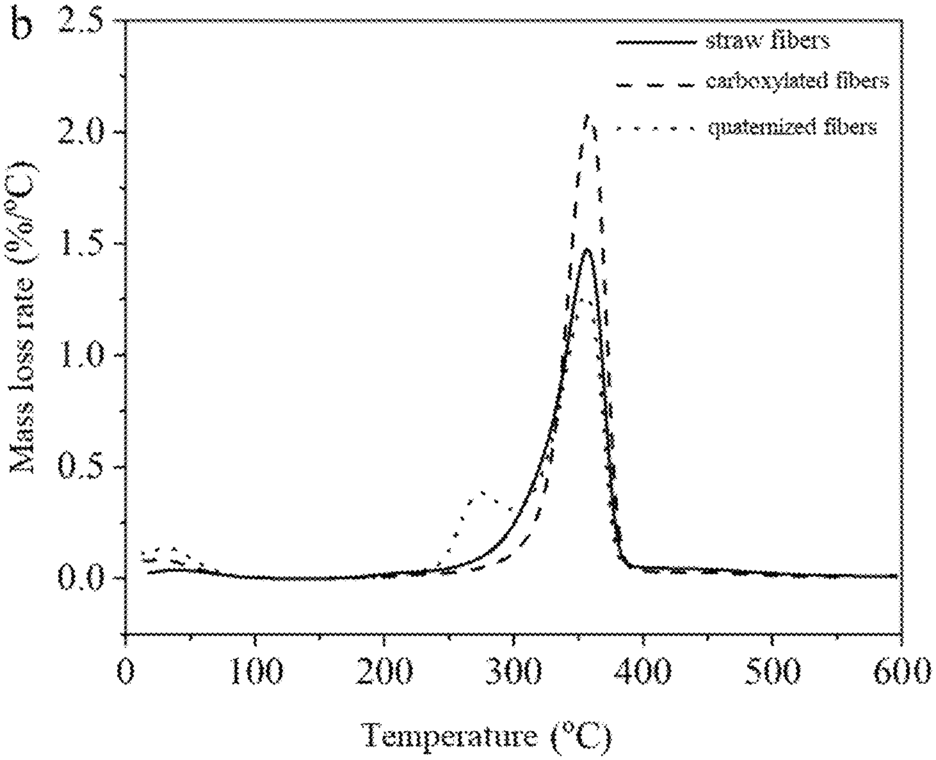
Figure 5C:
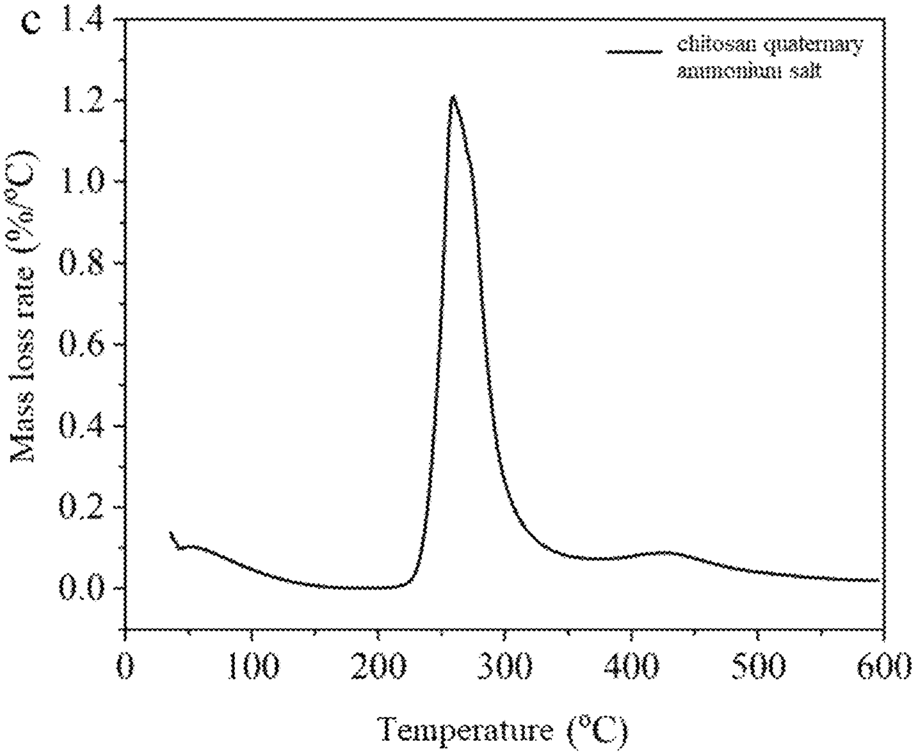

FIGS. 5A to 5C illustrate graphs of thermogravimetric analysis (TGA) curves and first derivative curves (DTG) of the TGA curves of the straw fibers, the carboxylated fibers, and the quaternized fibers in the embodiment 1, weight loss starting point ($T_{onset}$), peak value ($T_{max}$), and residual carbon amount of which are regarded as main parameters in thermogravimetry. As can be seen from FIG. 5A to 5C, for the straw fibers, moisture removal was a major loss of weight at a temperature of less than 100° C.; and the main weight loss was depolymerization and decomposition of the cellulose at a temperature of 300° C. to 400° C. For the carboxylated fibers, the thermal degradation curve was similar to that of the straw fibers, a maximum decomposition temperature thereof was increased to 356.68° C., and it was obtained that the concentration of the oxalic acid of 25% can effectively improve the thermal stability of the fibers. The DTG curve of the quaternized fibers had a pyrolytic peak at 260.32° C., which came from the chitosan quaternary ammonium salts, and the other one pyrolytic peak belonging to the quaternized fibers was at 355.81° C.

Figure 6A:
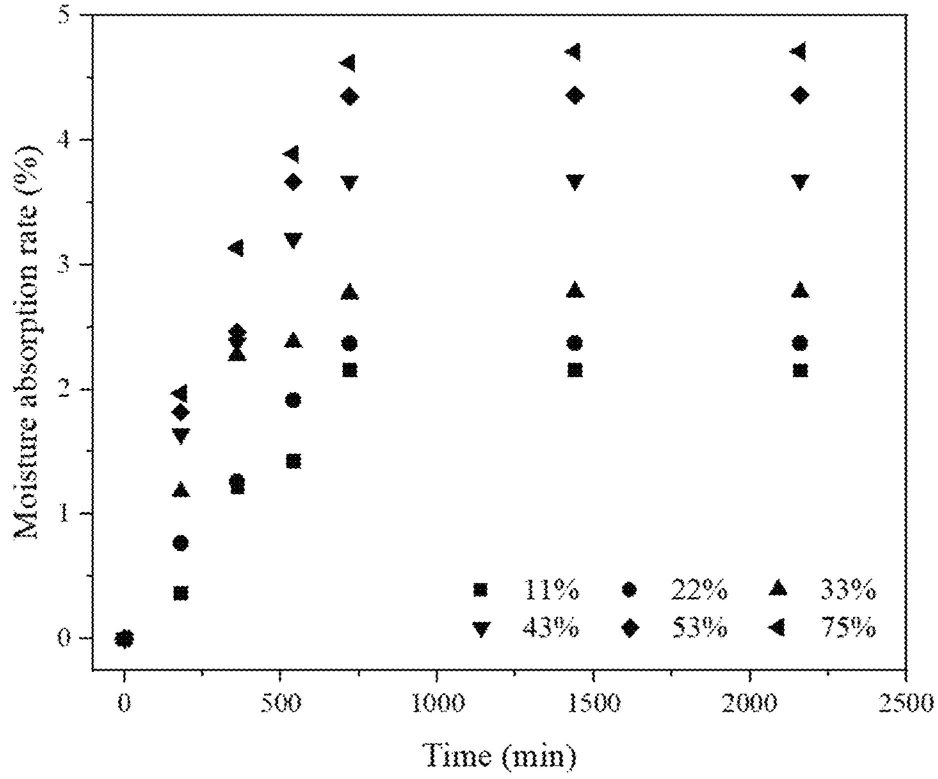
FIGS. 6A to 6C illustrate schematic diagrams of moisture absorption results of a straw fiber paper, a quaternized fiber paper, and an intelligent label paper prepared in the embodiment 1.
Figure 6B:
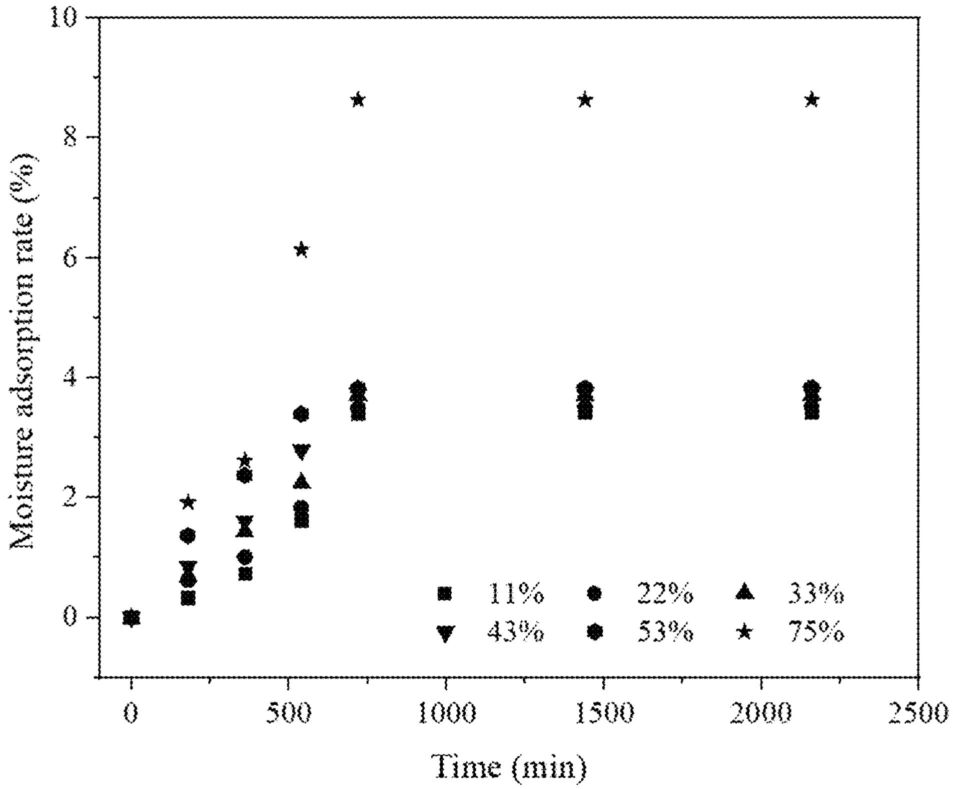
Figure 6C:
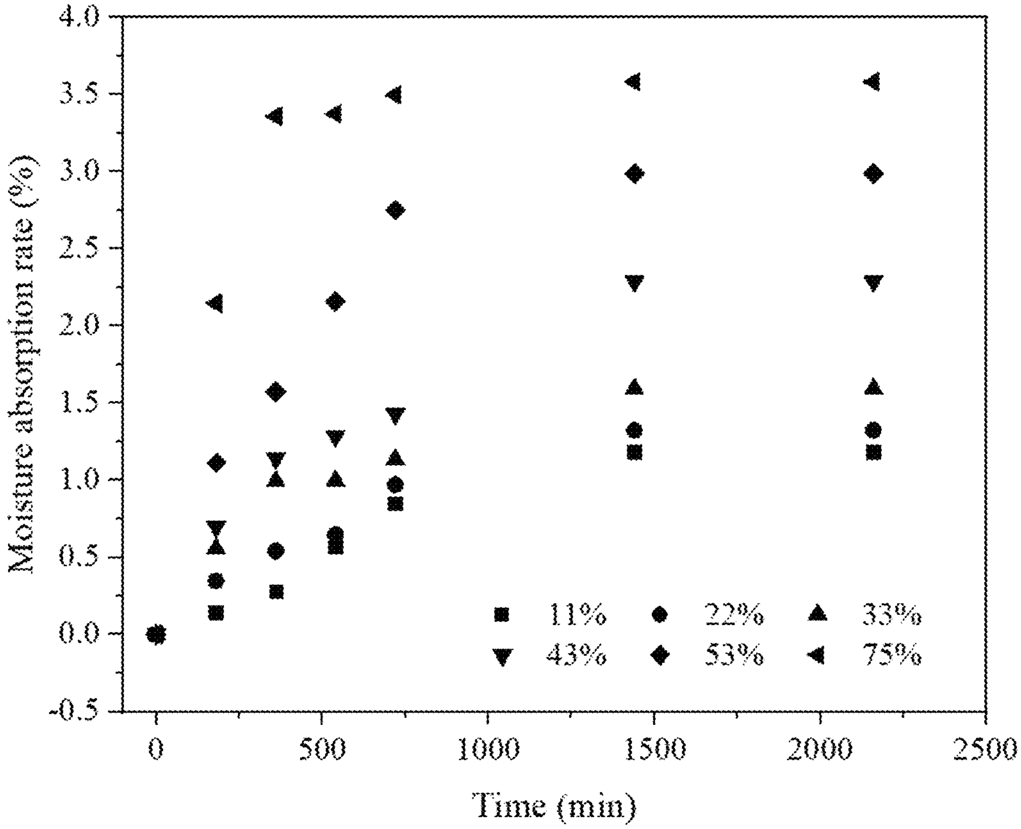

The multifunctional intelligent cellulose-based visual label prepared in the embodiment 1, the straw fiber paper, and the quaternized fiber paper were cut into a size of 0.6 centimeter (cm)×0.6 cm, respectively, and initial qualities thereof were measured. Then, the various types of paper were placed in different humidity environments (11%, 22%, 33%, 43%, 53%, and 75%) for constant-humidity treatment, and mass variations thereof were calculated after 3 h, 6 h, 9 h, 12 h, 24 h, and 48 h, respectively. The moisture absorption results are shown in FIGS. 6A to 6C, where FIG. 6A illustrates the moisture absorption performance of the straw fiber paper, FIG. 6B illustrates the moisture absorption performance of the quaternized fiber paper, and FIG. 6C illustrates the moisture absorption performance of the intelligent label. Furthermore, it can be seen from FIGS. 6A to 6C that under any humidity, the straw fiber paper, the quaternized fiber paper, and the intelligent label all absorbed moisture; and under higher humidity, the samples (also referred to the straw fiber paper, the quaternized fiber paper, and the intelligent label) absorbed more of the moisture. It is noted that the moisture absorption capacity of the intelligent label paper was significantly weaker than that of the straw fiber paper and that of the quaternized fiber paper because upon adsorption of the dyes, functional groups capable of binding to the moisture in the intelligent label were reduced. The lower moisture absorption capability indicates that the intelligent label paper had good dimensional stability.

Figure 7A:
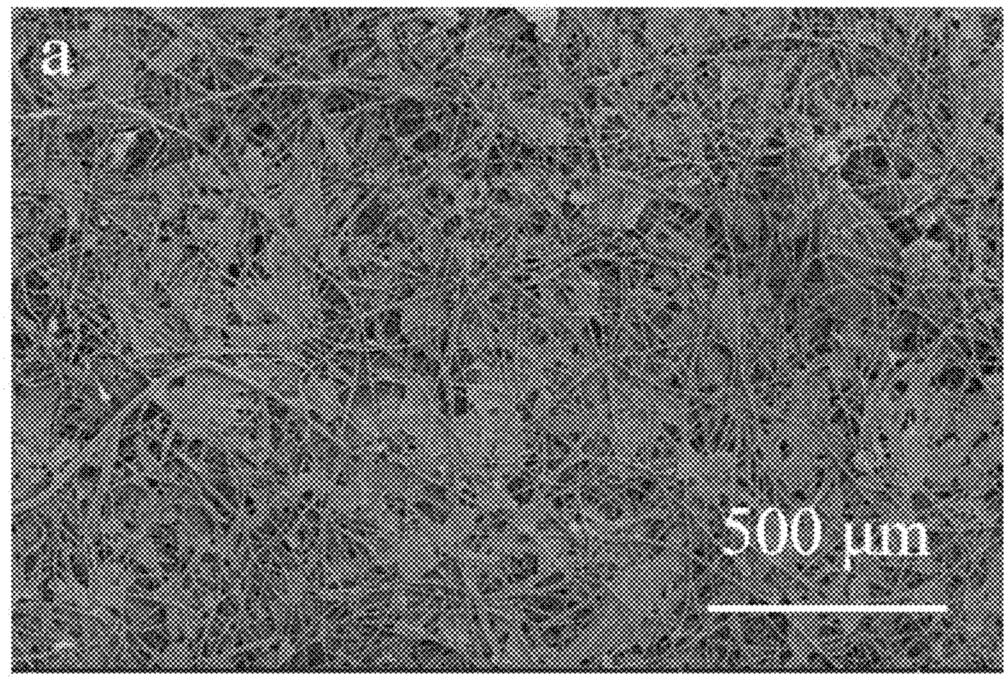
FIGS. 7A to 7D illustrate scanning electron microscope (SEM) photos of the straw fiber paper, a carboxylated fiber paper, the quaternized fiber paper, and the intelligent label paper prepared in the embodiment 1.
Figure 7B:
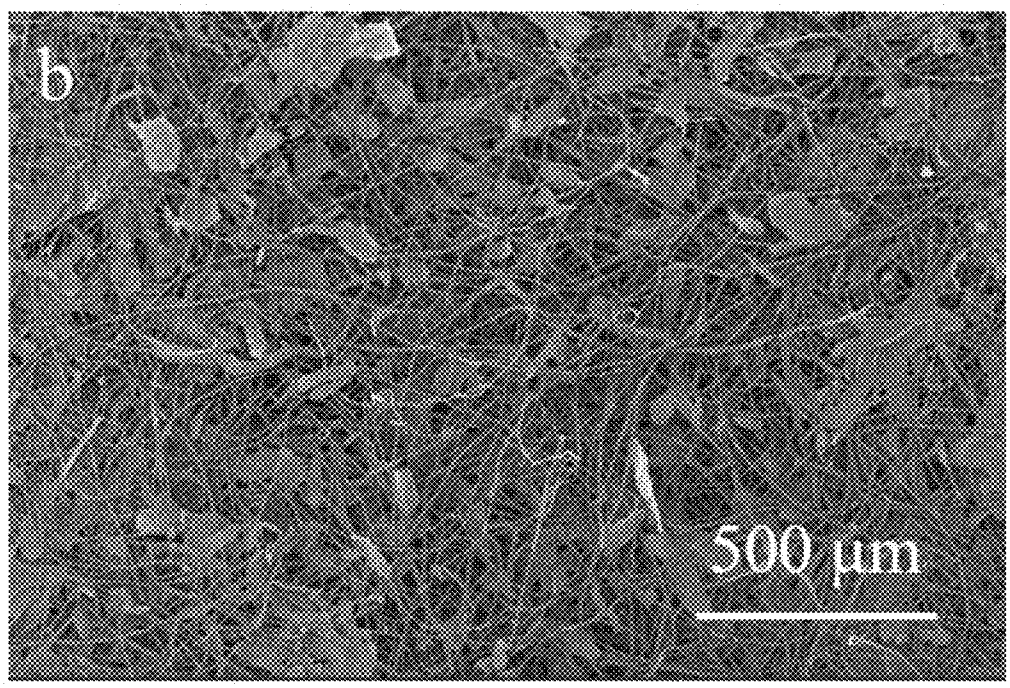
Figure 7C:
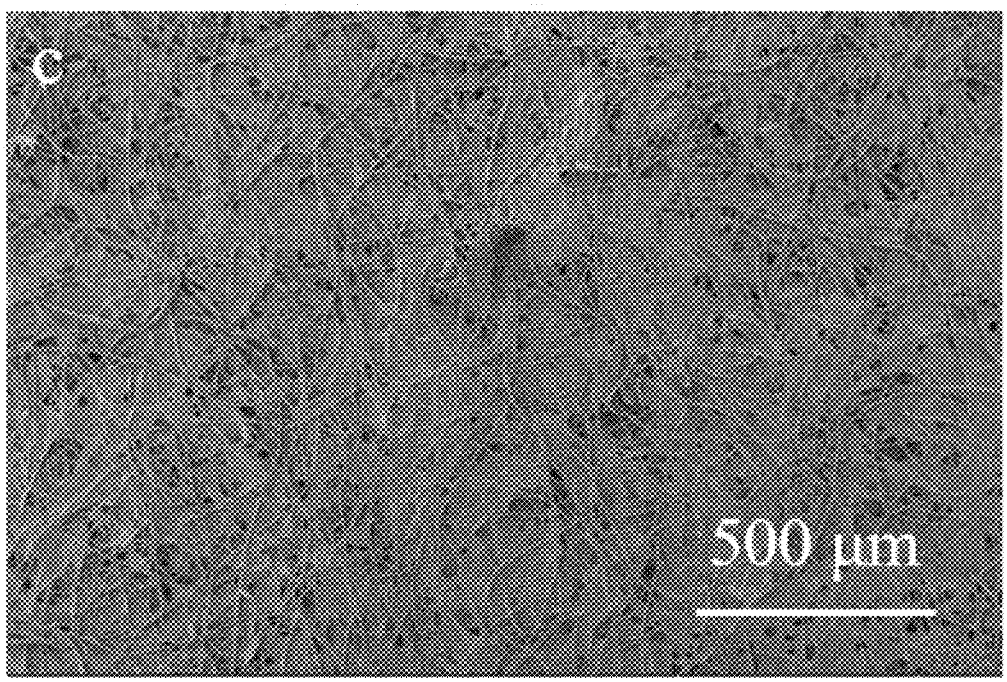
Figure 7D:
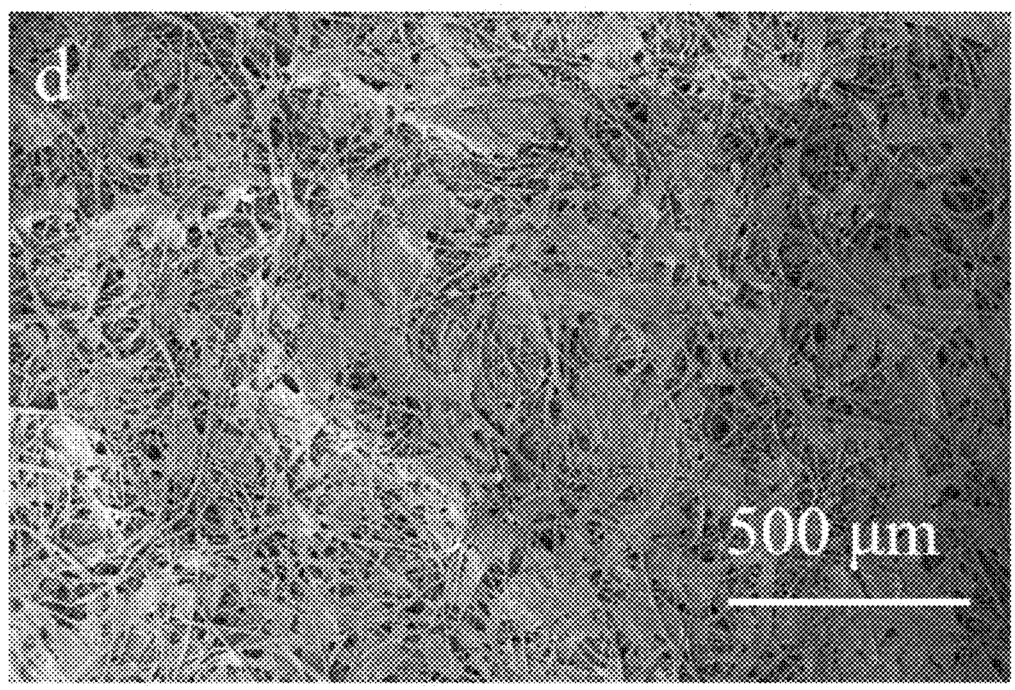

FIGS. 7A to 7D illustrate scanning electron microscope (SEM) photos of the straw fiber paper, the carboxylated fiber paper, the quaternized fiber paper, and the intelligent label paper prepared in the embodiment 1. It can be seen from FIGS. 7A to 7D that after the straw fibers were carboxylated, the carboxylated fibers were shortened, and the composition structure thereof was looser; after the straw fiber were quaternized, the chitosan quaternary ammonium salts were connected with the surrounding fibers like the glue, thereby forming a compact fiber network. As the intelligent label paper was prepared in an alkaline environment, as shown in FIG. 7D, the alkali solution had slight damage to the connection between the fibers.

Figure 8A:
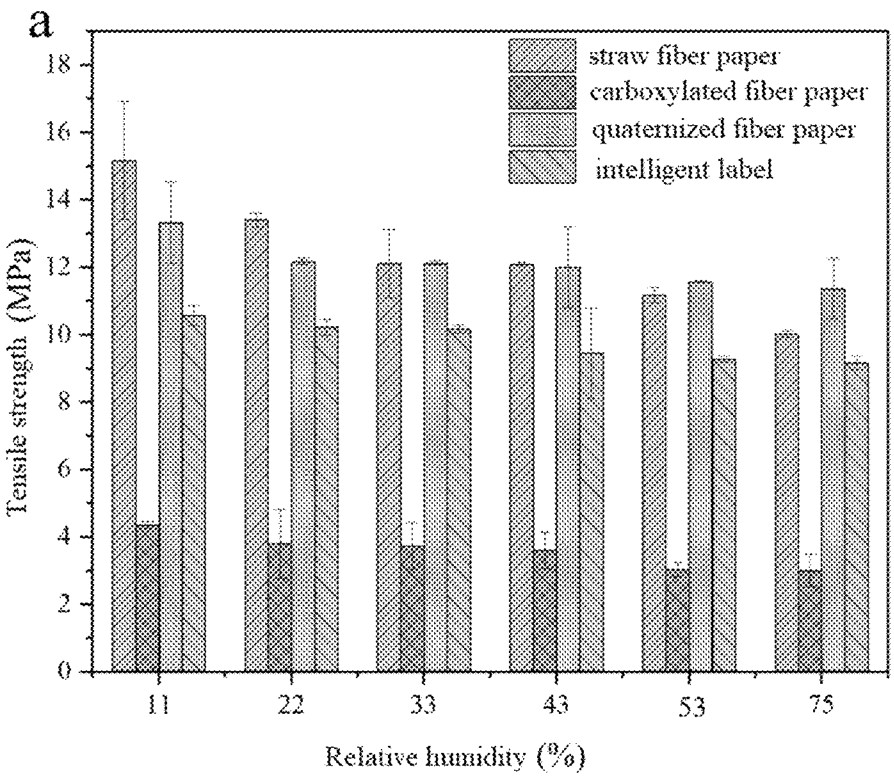
FIGS. 8A to 8B illustrate mechanical property diagrams of the straw fiber paper, the carboxylated fiber paper, the quaternized fiber paper, and the intelligent label paper prepared in the embodiment 1.
Figure 8B:
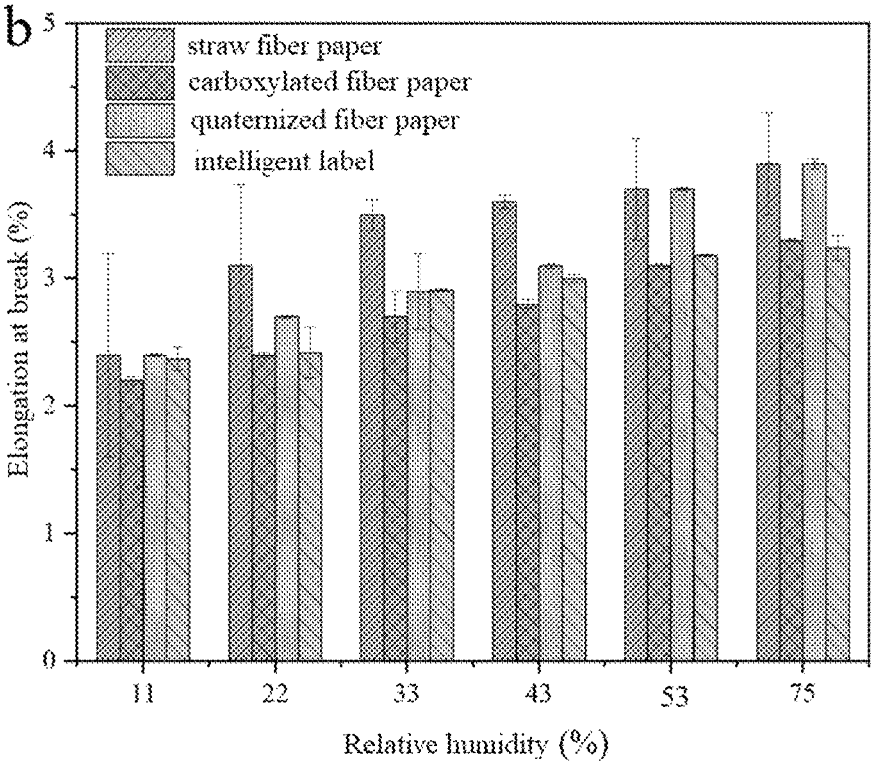

FIGS. 8A to 8B illustrate mechanical property diagrams of the straw fiber paper, the carboxylated fiber paper, the quaternized fiber paper, and the intelligent label paper prepared in the embodiment 1. As can be seen from FIGS. 8A to 8B, as the humidity increases from 11% to 75%, the tensile strength of the straw fiber paper decreased from 15.17 mega Pascal (MPa) to 10.03 MPa, and the elongation at break thereof increased from 2.4% to 3.9%; the tensile strength of the carboxylated fiber paper decreased from 4.36 MPa to 3.01 MPa, and the elongation at break thereof increased from 2.2% to 3.3%; the tensile strength of the quaternized fiber paper decreased from 13.33 MPa to 11.37 MPa, and the elongation at break thereof increased from 2.4% to 3.9%; the tensile strength of the intelligent label paper reduced from 10.58 MPa to 9.17 MPa; and the elongation at break thereof increased from 2.3% to 3.24%. The results in FIGS. 8A to 8B correspond to the results in the electron microscope photos in FIGS. 7A to 7D because that the fiber length was shortened after the oxalic acid treatment, the paper structure was loose, and then the mechanical property of the fibers was obviously reduced; and a compact structure formed after the chitosan quaternary ammonium salts were introduced to greatly improve the problem of poor mechanical properties. In addition, it should be noted that the influence of humidity on mechanical properties was very small, indicating that the intelligent label can maintain the dimensional stability regardless of any humidity, which is very advantageous in practical applications.

Release performance of the intelligent visual label prepared in the embodiment 1 was tested at 50% and 95% ethanol/aqueous solutions, including: placing the intelligent visual label in the 50% and 95% ethanol/aqueous solutions, respectively, after shaking with a speed of 130 r/min at room temperature for 24 h, testing that the bromothymol blue and the methyl red were released none by measuring ultraviolet of supernatants of the 50% and 95% ethanol/aqueous solutions, which indicated that the security of the prepared indicator label is confirmed.

Figure 9A:
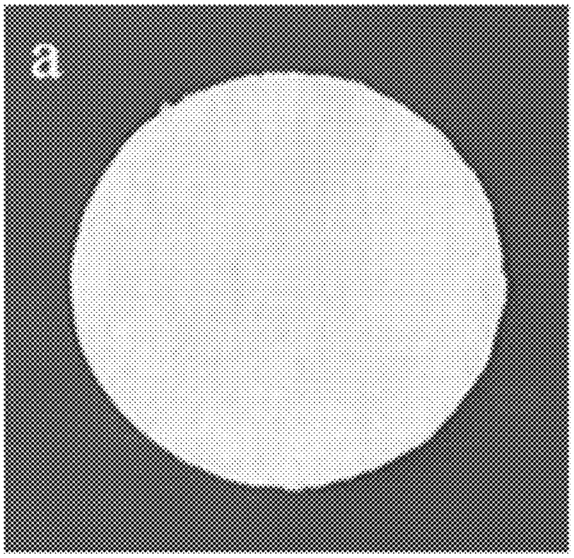
FIGS. 9A to 9E illustrate a photograph and schematic diagrams of surfaces and cross-sectional morphologies of an intelligent visual label prepared in the embodiment 1.
Figure 9B:
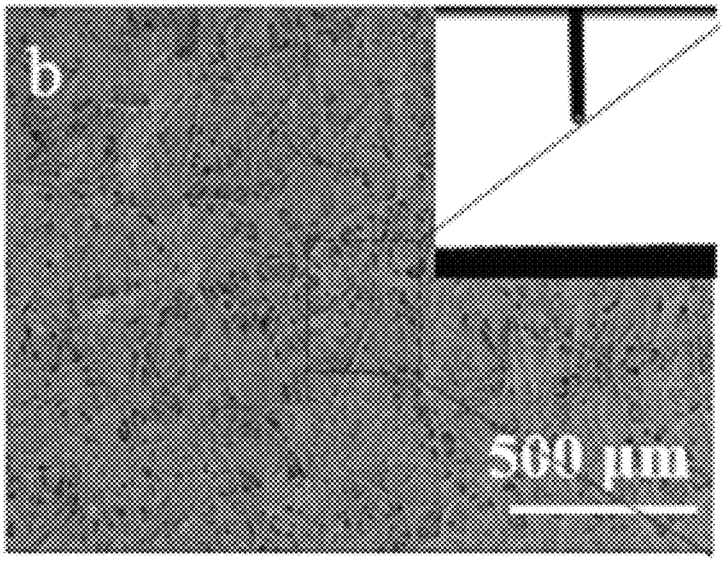
Figure 9C:
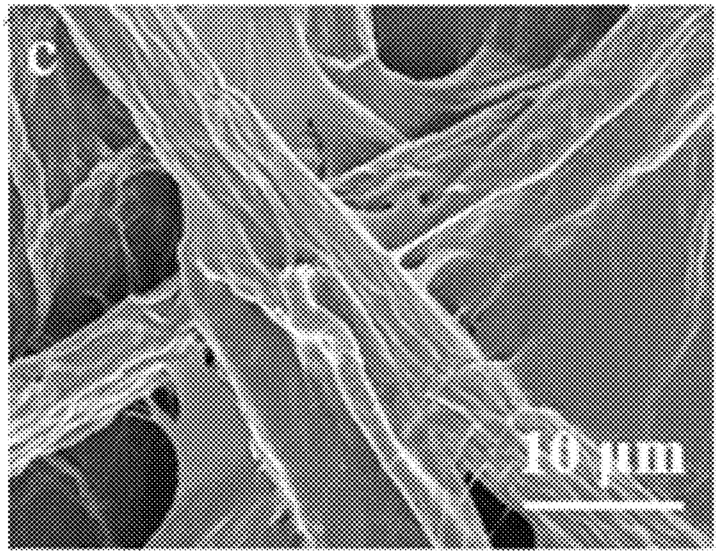
Figure 9D:
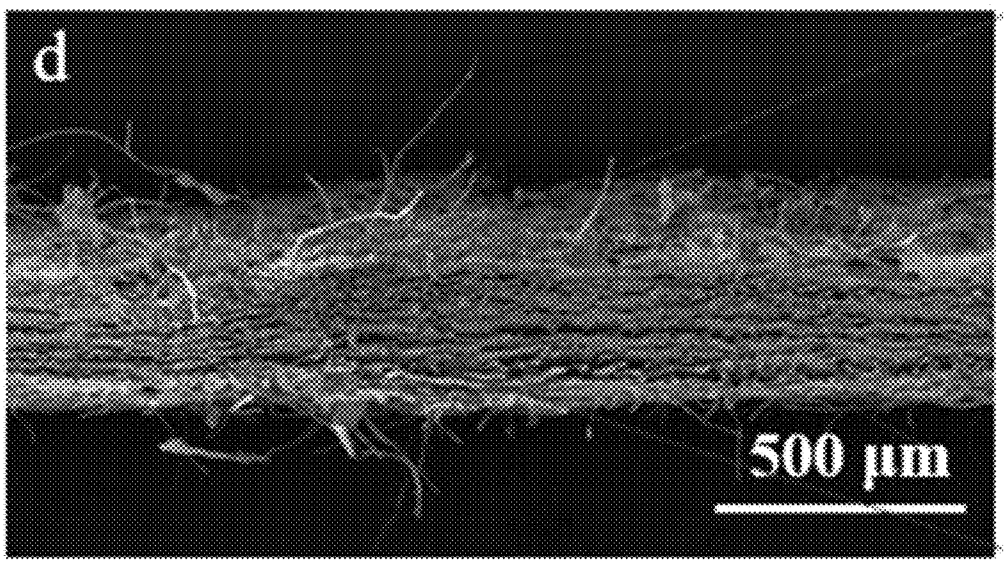
Figure 9E:
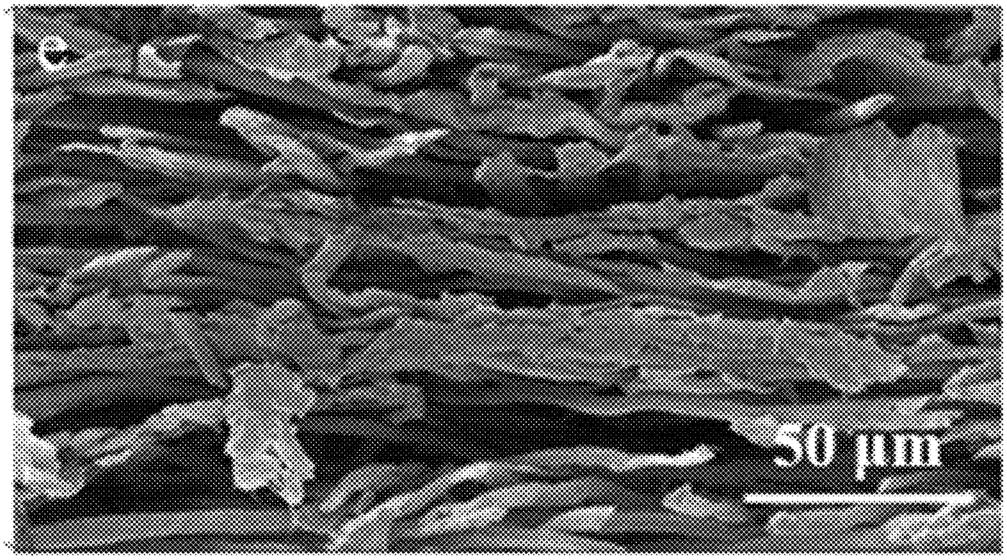

As shown in FIGS. 9A to 9E, a photograph and schematic diagrams of surfaces and cross-sectional morphologies of the intelligent visual label prepared in the embodiment 1 are provided. FIG. 9A illustrates a full view of the intelligent label, FIG. 9B illustrates a surface morphology of the intelligent label, FIG. 9C illustrates a surface morphology of the intelligent label at a high magnification, FIG. 9D illustrates a cross-sectional morphology of the intelligent label, and FIG. 9E illustrates a cross-sectional morphology of the intelligent label at a high magnification. As can be seen from FIG. 9B and FIG. 9C, the single fibers can be interwoven with each other by the hydrogen bond and the chitosan quaternary ammonium salts, which enhanced the fiber fastness; it can be seen from the cross-sectional electron microscope diagrams in FIG. 9D and FIG. 9E that the intelligent label had a multi-layer structure, and the fibers were first self-assembled to form a planar structure and then stacked to form the multi-layer structure, which helps to detect gas, faster contact with response factors, and improved the sensitivity of the intelligent label. In addition, the intelligent label also exhibited an ultra-high hydrophily, contributing to subsequent use thereof in milk monitoring.

Hydrogen of potential (pH) response characteristic is critical to track food freshness. Therefore, a responsiveness of the intelligent visual label prepared in the embodiment 1 to a pH value at 3-9 is tested. As a result, as the pH value increased, the intelligent label produced a color variation that is clearly visible to naked eyes. When the pH value was 3-4, the color of the intelligent visual label was varied to meat pink; when the pH value was 5, the color of the intelligent visual label was varied to orange; when the pH value was 6, the color of the intelligent visual label was varied to yellow; when the pH value was 7, the color of the intelligent visual label was varied to green; and the pH value was 8, the color of the intelligent visual label was varied to blue green. The color variation as the parameter also demonstrates its variation trend: as the pH value increased, a* decreased, indicating that the color gradually varied from red to green; b* first increased and then decreased, reaching the maximum when the pH value is 6, indicating that the color of the intelligent visual label varied to yellow when the pH value was less than 6, and the color of the intelligent visual label varies to blue when the pH value was greater than 6. In addition, a color difference value was greater than 30 under an acidic condition, and the color difference value was gradually reduced as the pH value increases. Therefore, the intelligent visual label is applicable to a wide pH value range and can be used to indicate the variation when the pH value falls within 4-8.

Sensitivities of the intelligent visual label prepared in the embodiment 1 to responses of the acid and the alkali gases are tested. As a result, the color of the intelligent visual label gradually varied from green to yellow beginning from the corner of the label within 30 seconds (s), and the intelligent label had become yellow completely within 30 s at a humidity of 75% because that more water was gathered on the surface of the intelligent label under a large humidity, and then, the intelligent label reacted with the gas more quickly, thereby making response on the color variation. As the response time increased, the color of the intelligent visual label continued to vary from yellow to pink. The response law of the intelligent visual label to triethylamine gas was substantially similar to that of the acetic acid gas, except that the color gradually varies from green to blue green when applied in the triethylamine gas.

Figure 10:
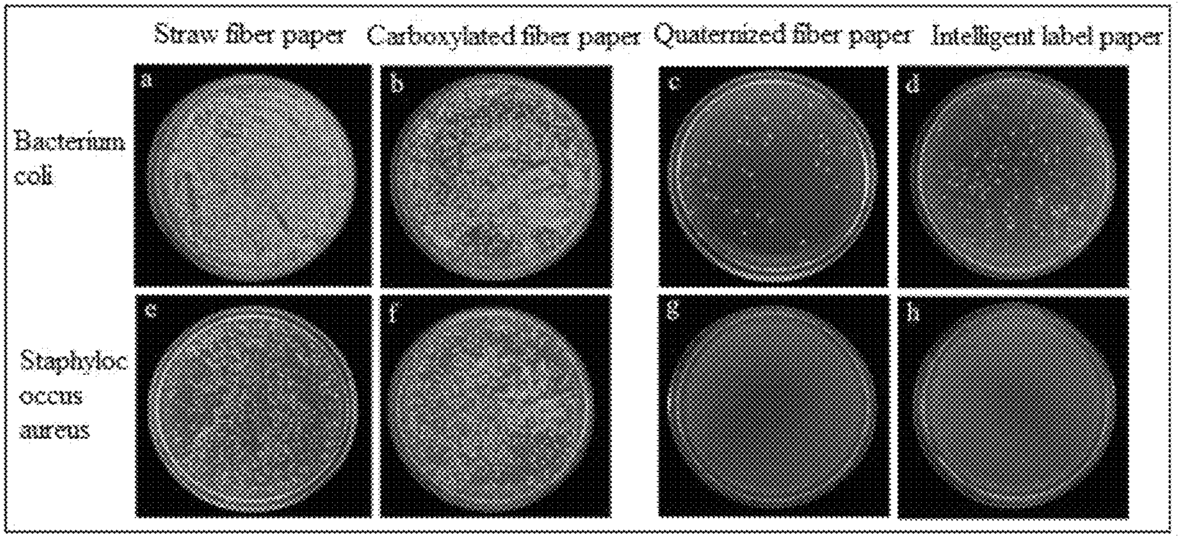
FIG. 10 illustrates antibacterial results of the straw fiber paper, the carboxylated fiber paper, the quaternized fiber paper, and the intelligent label paper prepared in the embodiment 1.
Figure 11A:
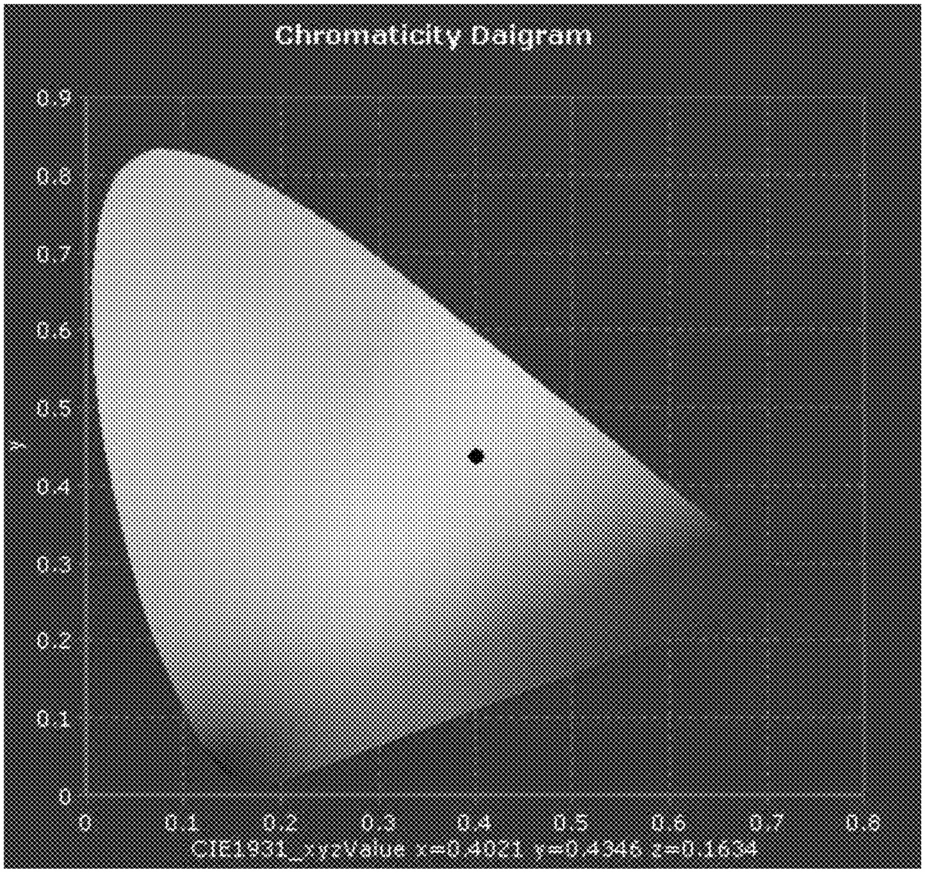
FIGS. 11A to 11D illustrate color variation diagrams of the intelligent label prepared in the embodiment 1 during milk monitoring.
Figure 11B:
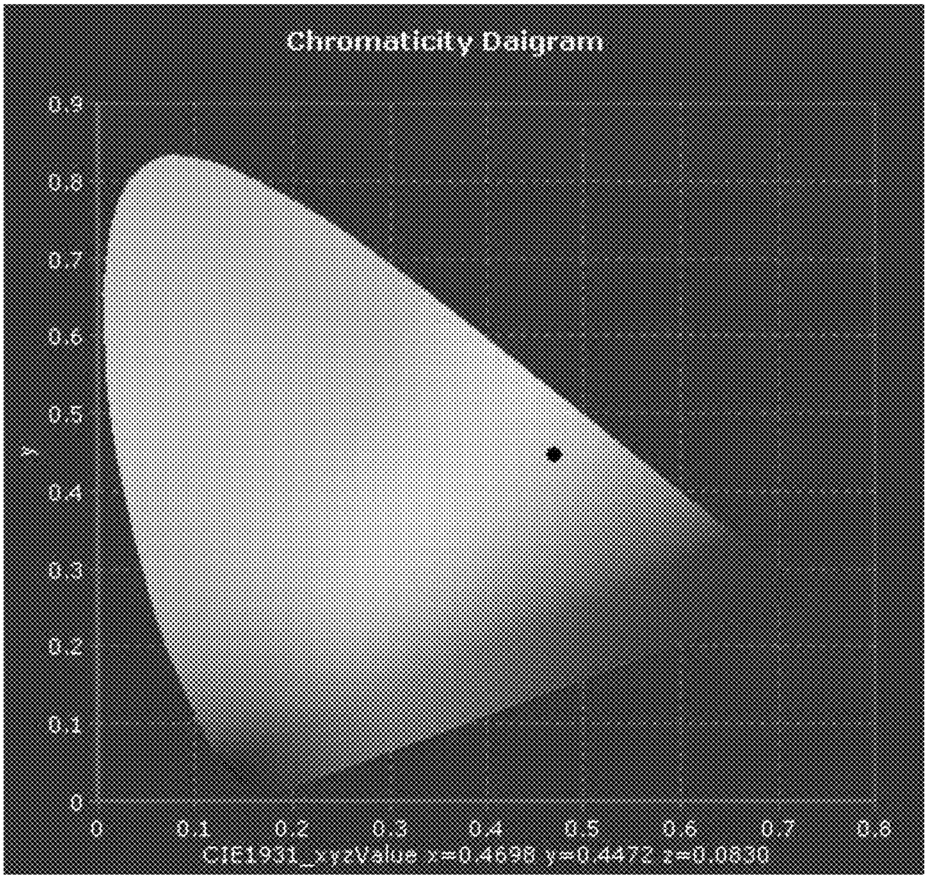
Figure 11C:
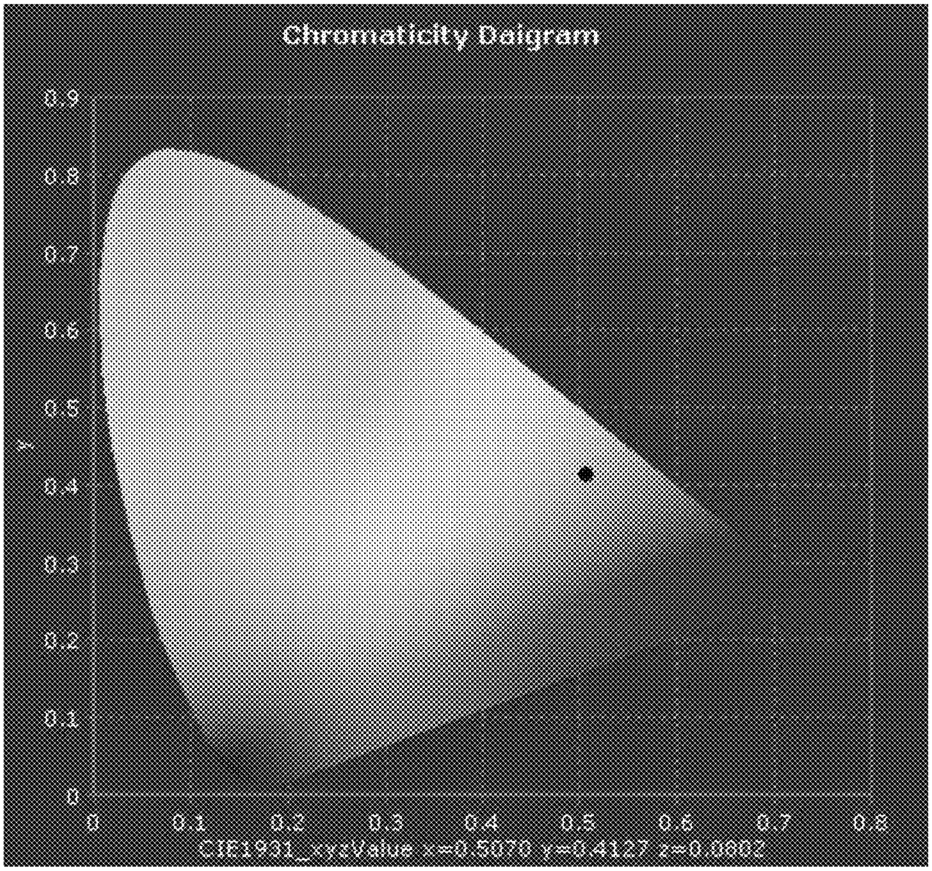
Figure 11D:
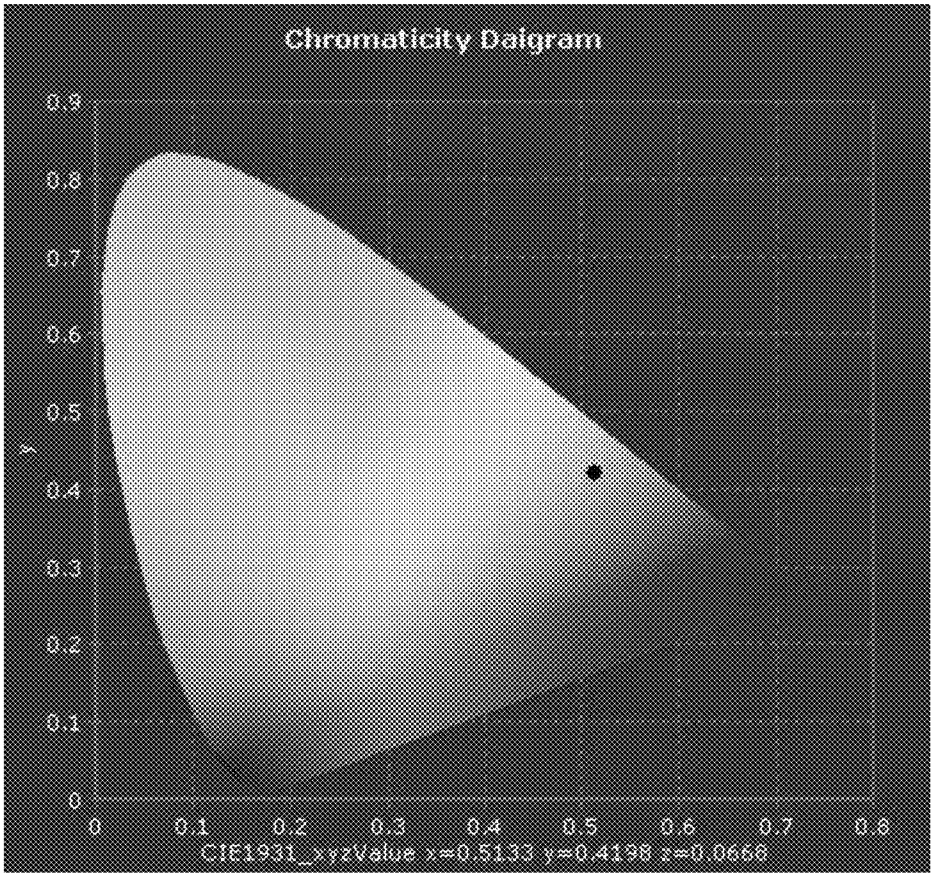

Antibacterial results of the straw fiber paper (SC), the carboxylated fiber paper (OASC), the quaternized fiber paper (CQ-OASC), and the intelligent label paper prepared in the embodiment 1 are shown in FIG. 10. It can be seen from a, b, e, and f of FIG. 10 that *Escherichia coli* (*E. coli*) and *Staphylococcus aureus* (*S. aureus*) showed strong viability, which indicated that the straw fibers and the carboxylated fibers didn't have a bacteriostatic ability. After the chitosan quaternary ammonium salts were introduced, the bacteriostatic abilities to the *E. coli* and the *S. aureus* increased to 98.3% and 100%, as shown in c and g of FIG. 10. Meanwhile, the antibacterial abilities of the intelligent label to the two bacteria were 91.7% and 100%, respectively, indicating the excellent bacteriostatic abilities, as shown in d and h of FIG. 10. Due to the fact that the *E. coli* has an outer membrane composed of polysaccharide, phospholipid bilayer, and lipoprotein, thereby protecting the *E. coli* from being damaged, and therefore, the antibacterial ability of the prepared sample to the *E. coli* is slightly worse than that of the *S. aureus*.

Figure 12:
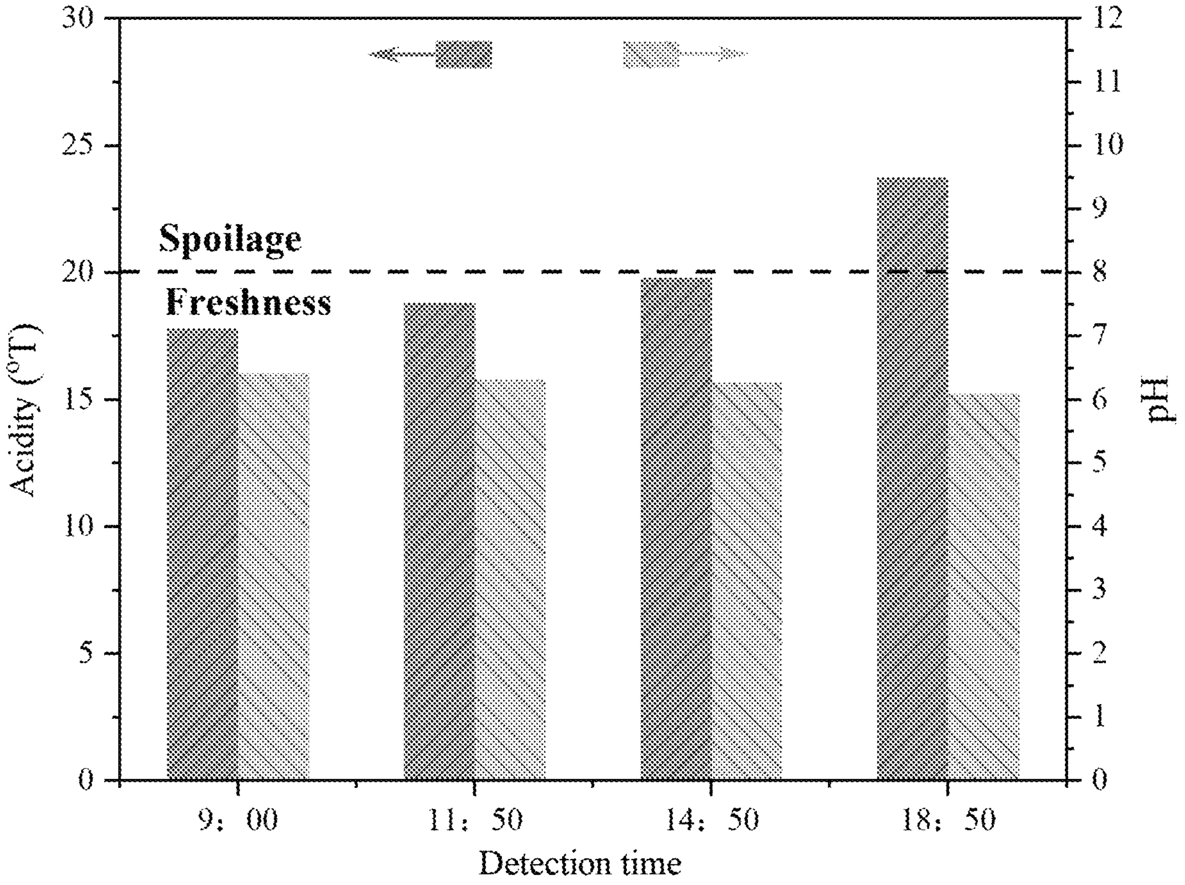
FIG. 12 illustrates a schematic diagram of a variation of acidity of milk in the milk monitoring by using the intelligent label prepared in the embodiment 1.

In order to evaluate the application of the intelligent label in practice, the intelligent label prepared in the embodiment 1 was used to monitor the freshness of milk, and the method includes: purchasing fresh milk from a supermarket and storing the fresh milk at 40° C. And then, 10 mL of the fresh milk was taken out at regular intervals, the acidity value and the pH value of the fresh milk were measured, an end of the intelligent label was immersed under the remaining milk, an image of the intelligent label immersed in the remaining milk was taken after waiting for 30 s, and a chromaticity value was measured. In the monitoring process, the color variations of the intelligent label are shown in FIGS. 11A to 11D, and the milk acidity variations are shown in FIG. 12. As can be seen from FIG. 12 and FIGS. 11A to 11D, the acidity and the pH value of the fresh milk are 17.8° T and 6.42, respectively, the initial intelligent label is present in green, and the chromaticity parameters thereof are as follows: a=−12.25 and b=10.13. After 170 min, the acidity of the milk increased to 18.81° T, the pH value reduced to 6.33, the corresponding intelligent label was present in yellow green, and at this time, the chromaticity parameters thereof were as follows: a=−3.94 and b=16.06. At 14:50 pm, the acidity value of the milk increased to 19.8° T close to a threshold (20° T.) of the edible milk, and it is noted that the intelligent label began to vary to yellow orange, indicating that its indication was very timely. At 18:50 PM, the acidity of the milk reached 23.76° T, at which time the milk had been fully spoiled and the intelligent label varied to orange red. As also can be seen from FIG. 12, during storing the milk, the pH value variation was very small, but the prepared intelligent label accurately captured its minor variations and makes a response timely.

Figure 13:
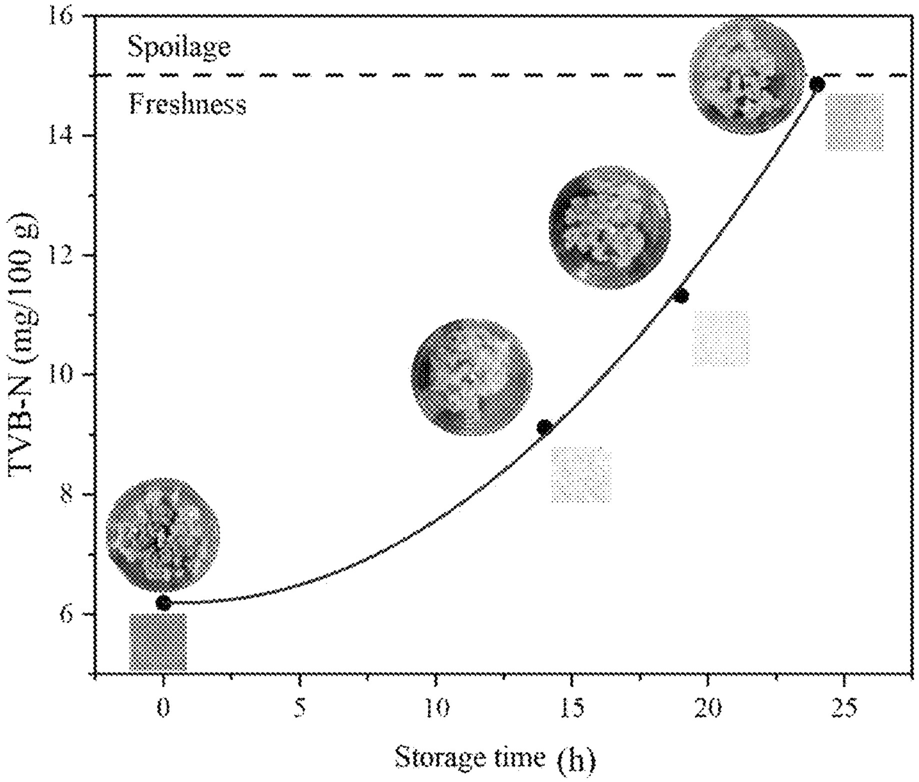
FIG. 13 illustrates a schematic diagram of total volatile basic nitrogen (TVB-N) versus time for monitoring pork with the intelligent label prepared in Example 1.

During pork storage, polysaccharides can decompose to produce lactic acid and carbon dioxide due to the action of enzymes and spoilage bacteria, which produce total volatile basic nitrogen (TVB-N). As TVB-N increased as the increasing pork storage time, the intelligent visual label of the disclosure was a better choice as a freshness detection indicator. According to Chinese Food Standards GB2707-2016, a threshold for the TVB-N of the edible pork is 15 milligrams per 100 grams (mg/100 g). The freshness of pork was monitored by using the intelligent visual label prepared in the embodiment 1. As shown in FIG. 13, the TVB-N value of fresh pork was 6.19 mg/100 g, and the initial color of the intelligent visual label was green. As the storage time increased, the TVB-N value gradually increased due to the decomposition of the protein and reached 14.86 mg/100 g after 24 hours. Furthermore, during the entire pork storage, the color variations of the intelligent visual label changed from green originally to light green, yellow, green. This is because the polysaccharide of the pork will preferentially decompose under the action of enzymes and microorganisms to produce lactic acid and carbon dioxide, in this stage, when a tester closes to the pork, the tester will smell weak sour; and therefore, the intelligent visual label varies to yellow. After the polysaccharide is exhausted, the protein begins to decompose to produce the TVB-N, the headspace environment above the pork is gradually changed from acidity to alkaline, the color of the intelligent visual label varies from yellow to green in time, and the color of the intelligent visual label does not change as the storage time increases.

The fresh spinach is rich in various vitamins and is well received by the public. However, spinach has a short shelf life at room temperature and is prone to corruption. The freshness of spinach is monitored by using the intelligent label prepared in the embodiment 1, and the following Table 1 illustrates various characteristic parameters of the spinach in the storage process: variations of weight loss rate, chlorophyll, and colonies number. The initial chlorophyll content of the spinach and the initial colonies number were 1.42% and 1.6 $\log_{10}$ colonies number per gram ($CFUg^{-1}$), respectively, indicating that the spinach was very fresh. As the storage time increased to day 9, the weight loss rate increased to 5.17% due to transpiration of the vegetables. The chlorophyll content degraded to 1.21% under the action of oxygen and enzymes. Notably, the colonies number increased to 4.5 $\log_{10}$ $CFUg^{-1}$, which is close to a colonies number threshold of the edible spinach (i.e., 5.0 $\log_{10}$ $CFUg^{-1}$). According to experimental results, vegetable storage was divided into four stages: particularly fresh, fresh, acceptable, close to spoilage, and the color of the intelligent visual label corresponding to the four stages are present in green, yellow green, yellow, and orange, respectively, which can be clearly distinguished by the naked eyes.

Table 1 illustrates the variations in the characteristic parameter values and the color of the intelligent visual label during the spinach storage.

| Storage time (d) | Weight loss (%) | Chlorophyll content (%) | Colonies number ($\log_{10}$ $CFUg^{-1}$) | Label color |
|---|---|---|---|---|
| 0 | 0 | 1.42 ± 0.05$^c$ | 1.6 ± 0.1$^b$ | Green |
| 3 | 1.97 ± 0.01$^a$ | 1.33 ± 0.02$^a$ | 3.9 ± 0.2$^a$ | Chartreuse |
| 6 | 3.35 ± 0.03$^a$ | 1.27 ± 0.02$^a$ | 4.2 ± 0.5$^a$ | Yellow |
| 9 | 5.17 ± 0.01$^c$ | 1.21 ± 0.01$^c$ | 4.5 ± 0.7$^a$ | Orange |

Embodiment 2 differs from the embodiment 1 in that the mass percentage concentration of the oxalic acid aqueous solution added in the step 1 is 10%, and the other technical features are the same as the embodiment 1.

Embodiment 3 differs from the embodiment 1 in that the mass percentage concentration of the oxalic acid aqueous solution added in the step 1 is 15%, and the other technical features are the same as the embodiment 1.

Embodiment 4 differs from the embodiment 1 in that the mass percentage concentration of the oxalic acid aqueous solution added in the step 1 is 20%, and the other technical features are the same as the embodiment 1.

Embodiment 5 differs from the embodiment 1 in that the mass percentage concentration of the oxalic acid aqueous solution added in the step 1 is 30%, and the other technical features are the same as the embodiment 1.

Embodiment 6 differs from the embodiment 1 in that the mass percentage concentration of the oxalic acid aqueous solution added in the step 1 is 40%, and the other technical features are the same as the embodiment 1.

Embodiment 7 differs from the embodiment 1 in that the mass percentage concentration of the oxalic acid aqueous solution added in the step 1 is 50%, and the other technical features are the same as the embodiment 1.

Figure 14A:
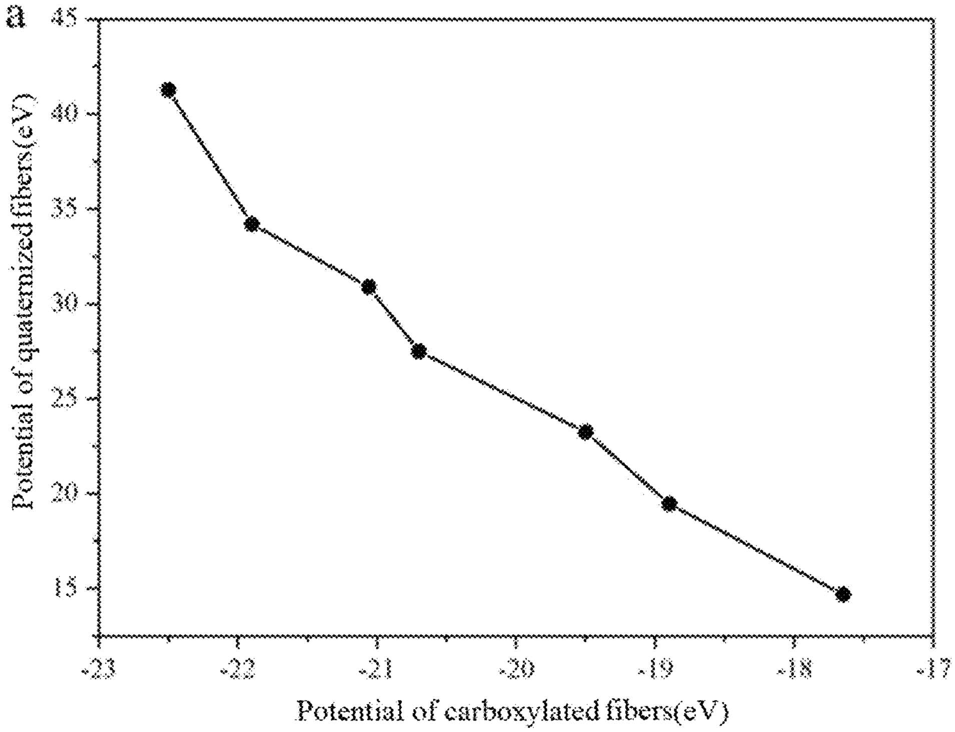
FIGS. 14A to 14B illustrate graphs of a Zeta potential and a carboxyl content of carboxylated fibers prepared in embodiments 1-7 varied with an oxalic acid concentration.
Figure 14B:
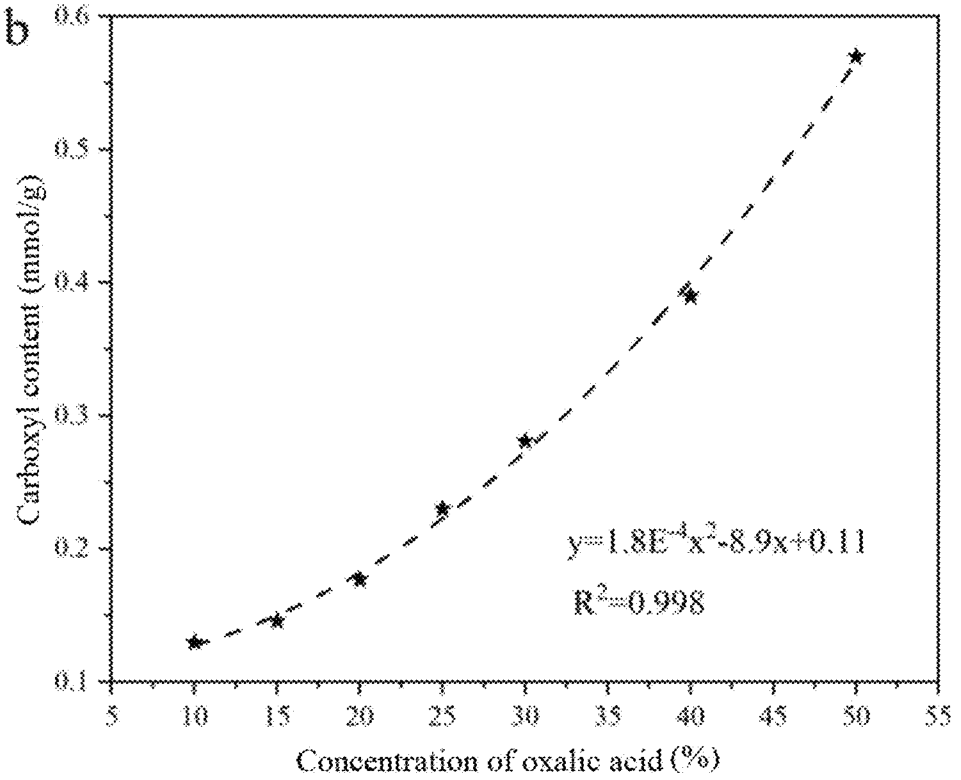

FIGS. 14A to 14B illustrate graphs of a Zeta potential and a carboxyl content of the carboxylated fibers prepared in the embodiments 1-7. FIG. 14A illustrates the Zeta potential values of the carboxylated fibers and the corresponding quaternized fibers and FIG. 14B illustrates the relationship curve between the carboxyl content and the oxalic acid concentration. As shown in FIG. 14A, the initial Zeta potential of the straw fibers was −4.71 mV, and it can be seen that as the oxalic acid concentration increases from 10% to 50%, the Zeta potential reduced from −17.65 mV to −22.5 mV. It can be seen from FIG. 14B that as the oxalic acid concentration increased from 10% to 50%, the carboxyl content increased from 0.13 mmol/g to 0.57 mmol/g and the relationship curve between the carboxyl content and the oxalic acid concentration can be fitted to $y=1.8\times10^4x^2-8.9x+0.11$ ($R^2=0.998$). It is worth noting that the carboxyl content is greatly increased after the oxalic acid concentration was greater than or equal to 25%. After the quaternization, when the oxalic acid concentration was higher, more chitosan quaternary ammonium salts can be grafted and more positive charges are introduced, indicating that the preferable acid concentration is 25%-50%.

Figure 15:
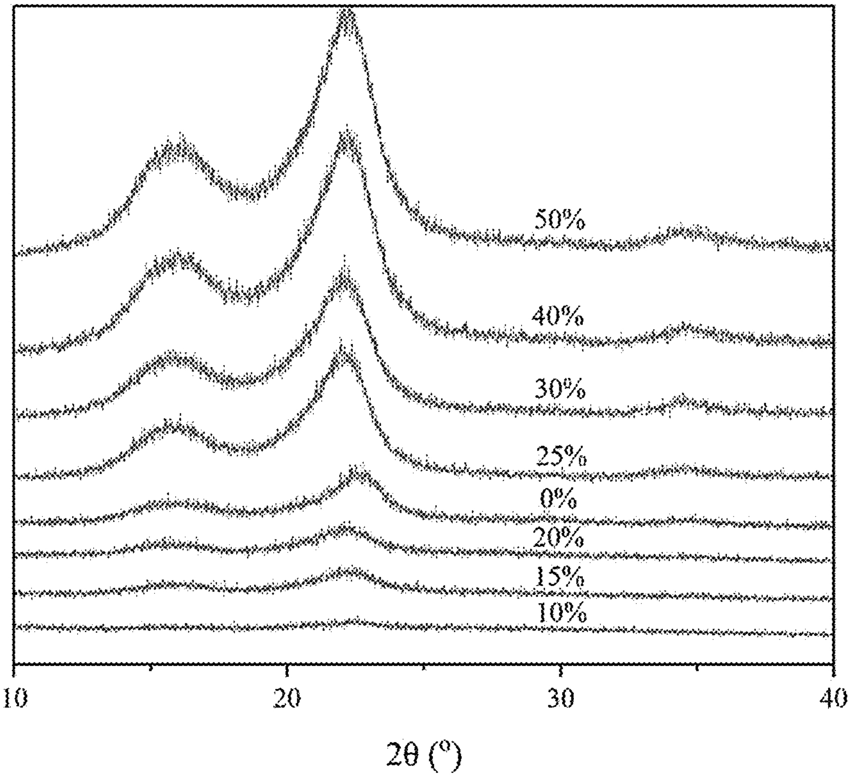
FIG. 15 illustrates an XRD spectrum diagram of the carboxylated fibers prepared in the embodiments 1-7.

FIG. 15 shows a spectrum diagram of the carboxylated fibers prepared in the embodiments 1-7. As can be seen from FIG. 15, when the acid concentration was less than 20%, as the acid concentration increased from 10% to 20%, the crystallinity of the carboxylated fibers increased from 30.5% to 55.9%, which reduced compared to the crystallinity of the straw fibers. After the acid concentration reached 20%, as the acid concentration increased from 25% to 50%, the crystallinity of the carboxylated fibers increased from 66.3% to 67.4%, which increased compared to the crystallinity of the straw fibers, thereby indicating that the preferable acid concentration is 25%-50%.

Figure 16:
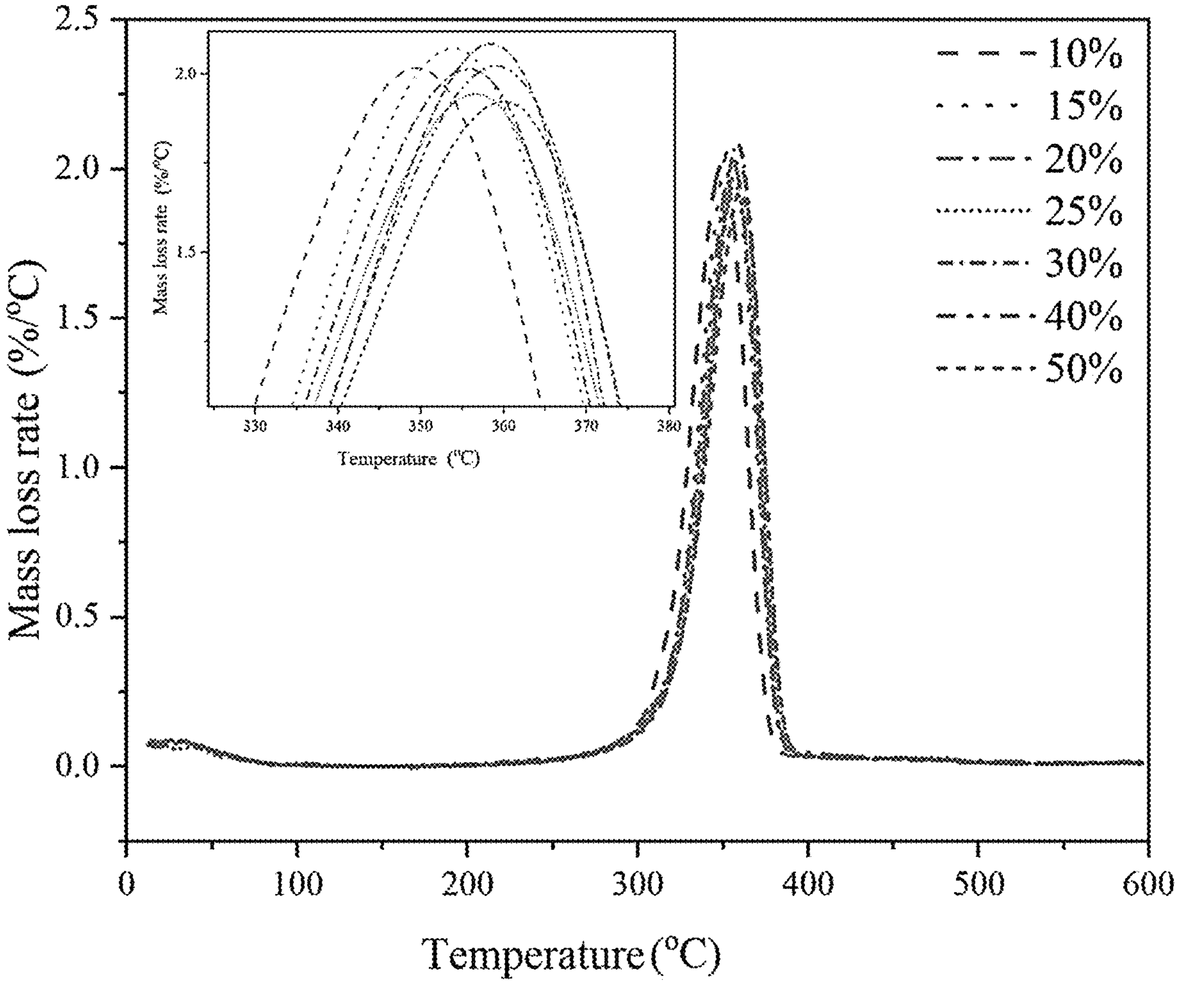
FIG. 16 illustrates a thermogravimetric curve of the carboxylated fibers prepared in the embodiments 1-7.

FIG. 16 shows a thermogravimetric curve of the carboxylated fibers prepared in the embodiments 1-7. It can be seen from FIG. 16 that when the acid concentration was less than 25%, $T_{max}$ increased from 349.56° C. to 355.86° C., which was below $T_{max}$ (i.e., 356.36° C.) of the straw fibers; and when the acid concentration was greater than or equal to 25%, $T_{max}$ increased from 356.68° C. to 360.17° C., which was higher than $T_{max}$ (i.e., 356.36° C.) of the straw fibers. Therefore, when the straw fibers were treated by the acid with the concentration higher than 20%, the thermal stability of the obtained carboxylated fibers can be significantly improved, which is consistent with the XRD results.

Embodiment 8 differs from the embodiment 1 in that the concentration of the chitosan quaternary ammonium salt aqueous solution added in the step 2 is 5 g/L, and the other technical features are the same as the embodiment 1.

Embodiment 9 differs from the embodiment 1 in that the concentration of the chitosan quaternary ammonium salt aqueous solution added in the step 2 is 10 g/L, and the other technical features are the same as the embodiment 1.

Embodiment 10 differs from the embodiment 1 in that the concentration of the chitosan quaternary ammonium salt aqueous solution added in the step 2 is 15 g/L, and the other technical features are the same as the embodiment 1.

Embodiment 11 differs from the embodiment 1 in that the concentration of the chitosan quaternary ammonium salt aqueous solution added in the step 2 is 25 g/L, and the other technical features are the same as the embodiment 1.

Embodiment 12 differs from the embodiment 1 in that the concentration of the chitosan quaternary ammonium salt aqueous solution added in the step 2 is 30 g/L, and the other technical features are the same as the embodiment 1.

Figure 17:
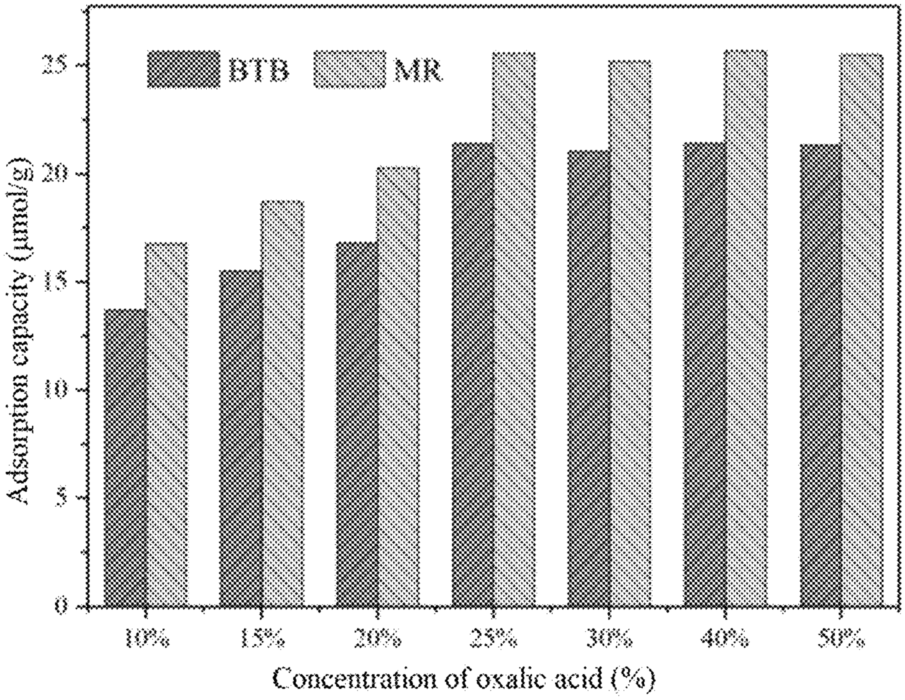
FIG. 17 illustrates a curve of an adsorption capacity of quaternized fibers prepared in the embodiments 1-7 for dyes varied with the oxalic acid concentration.

FIG. 17 illustrates the adsorption capacities of the quaternized fibers prepared in the embodiments 1-7 to the dyes. As the concentration of the oxalic acid increases from 10% to 50%, the adsorption capacity of the bromothymol blue (BTB) is increased from 13.71 micromoles per gram (μmol/g) to 21.33 μmol/g; and the adsorption capacity of the methyl red (MR) is increased from 16.76 μmol/g to 25.51 μmol/g, indicating that the better concentration range of the oxalic acid is 25% to 50%.

Figure 18:
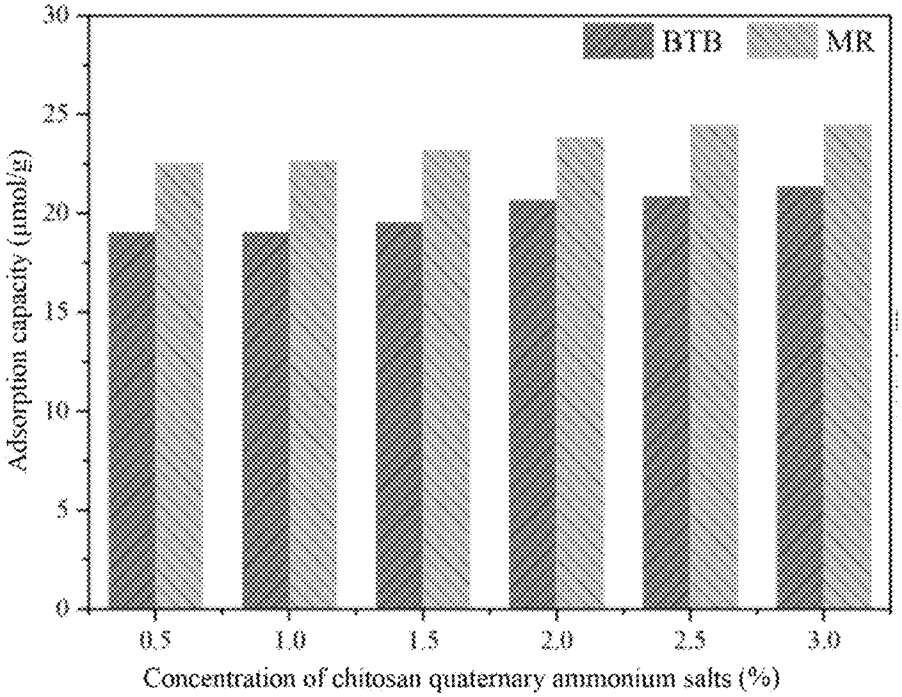
FIG. 18 illustrates a curve of an adsorption capacity of quaternized fibers prepared in embodiments 8-12 for dyes varied with chitosan quaternary ammonium salt concentration.

FIG. 18 illustrates the adsorption capacities of the quaternized fibers prepared in the embodiments 8-12 to the dyes. As the concentration of the chitosan quaternary ammonium salt increases from 5 g/L to 30 g/L, the adsorption capacity of the BTB is increased from 19.02 μmol/g to 21.36 μmol/g, and the adsorption amount of the MR is increased from 22.52 μmol/g to 24.47 μmol/g. After the concentration of the chitosan quaternary ammonium salt reaches 20 g/L, a continuous increase of the concentration of the chitosan quaternary ammonium salt has less influence on the adsorption capacity of the quaternized fibers, indicating that the better concentration range of the chitosan quaternary ammonium salt is 20 g/L to 30 g/L.

What is claimed is:

1. A method for preparing a cellulose-based visual label, comprising the following steps:

step 1, carboxylation modification, comprising: adding straw fibers into an oxalic acid aqueous solution with a mass percentage concentration of 25%-50%, heating the straw fibers and the oxalic acid aqueous solution to a temperature of 78 degrees Celsius (° C.) to 82° C. along with magnetic stirring for 0.5 hours (h) to 1 h to perform a reaction between the straw fibers and the oxalic acid aqueous solution; after the reaction is finished, obtaining a reaction product, adding absolute ethanol into the reaction product to remove residual oxalic acid of the reaction product and thereby to obtain a first product, and performing rotary evaporation on the first product to recycle ethanol in the first product and obtain a second product; filtering the second product to obtain filtrate, flushing precipitate in the filtrate with the ethanol until a conductivity of the filtrate is stable, and thereby obtaining carboxylated fibers;

step 2, cationic grafting, comprising: adding the carboxylated fibers into a chitosan quaternary ammonium salt aqueous solution with a concentration of 20 grams per liter (g/L) to 30 g/L, performing magnetic stirring on the carboxylated fibers and the chitosan quaternary ammonium salt aqueous solution for 0.5 h to 4 h at room temperature, and then filtering and washing with water to obtain quaternized fibers;

step 3, preparation of a composite dye solution, comprising: dissolving bromothymol blue and methyl red at a mass ratio of 1:(0.9-1) in a sodium hydroxide solution with a concentration of 0.045 moles per liter (mol/L) to 0.055 mol/L to obtain the composite dye solution;

step 4, preparation of responsive fibers, comprising: adding the quaternized fibers into the composite dye solution, placing the composite dye solution added with the quaternized fibers in an oscillating water bath machine to perform an oscillatory adsorption for 3.5 h to 4 h, and then eluting dyes physically attached to surfaces of the quaternized fibers with sodium hydroxide solution with a concentration of 0.045 mol/L to 0.055 mol/L, and washing the quaternized fibers with distilled water until a potential of hydrogen (pH) of the composite dye solution is neutral, thereby obtaining the responsive fibers; and step 5, preparation of the cellulose-based visual label, comprising: performing vacuum filtration on the responsive fibers to obtain paper with a basis weight of 65 grams per square meter ($g/m^2$) to 70 $g/m^2$, and then drying the paper to obtain the cellulose-based visual label.

2. The method for preparing the cellulose-based visual label as claimed in claim 1, wherein in the step 1, a mass ratio of the straw fibers to the oxalic acid aqueous solution with the mass percentage concentration of 25%-50% is 1:(49-51).

3. The method for preparing the cellulose-based visual label as claimed in claim 1, wherein when a difference between a conductivity of the filtrate before performing the filtering and a conductivity of the filtrate after performing the filtering for 10 minutes (min) to 15 min is less than 50 millisens per centimeter (mS/cm), the conductivity of the filtrate is stable.

4. The method for preparing the cellulose-based visual label as claimed in claim 1, wherein in the step 2, a solid-liquid mass ratio of the carboxylated fibers to the chitosan quaternary ammonium salt aqueous solution with the concentration of 20 g/L to 30 g/L is 1:(49-51).

5. The method for preparing the cellulose-based visual label as claimed in claim 1, wherein in the step 3, a concentration of the bromothymol blue in the composite dye solution is in a range of 49.9 milligrams per liter (mg/L) to 50.1 mg/L, and a concentration of the methyl red in the composite dye solution is in a range of 49.9 mg/L to 50.1 mg/L.

6. The method for preparing the cellulose-based visual label as claimed in claim 1, wherein in the step 4, a rotating speed of the oscillating water bath machine is in a range of 145 revolutions per minute (r/min) to 150 r/min.

* * * * *